(12) United States Patent
Turner

(10) Patent No.: US 12,205,385 B2
(45) Date of Patent: Jan. 21, 2025

(54) CELL COUNTING METHOD AND SYSTEM

(71) Applicant: Bradley Turner, Ringwood (GB)

(72) Inventor: Bradley Turner, Ringwood (GB)

( * ) Notice: Subject to any disclaimer, the term of this patent is extended or adjusted under 35 U.S.C. 154(b) by 426 days.

(21) Appl. No.: 17/749,836

(22) Filed: May 20, 2022

(65) Prior Publication Data

US 2022/0375241 A1    Nov. 24, 2022

(30) Foreign Application Priority Data

May 21, 2021    (GB) .................................... 2107320

(51) Int. Cl.
*G06V 20/69*    (2022.01)
*G02B 21/00*    (2006.01)
(Continued)

(52) U.S. Cl.
CPC .......... *G06V 20/698* (2022.01); *G02B 21/006* (2013.01); *G02B 21/06* (2013.01);
(Continued)

(58) Field of Classification Search
CPC ...... G06N 20/00; G06N 3/045; G06N 3/0455; G06N 3/02; G06N 3/0464;
(Continued)

(56) References Cited

U.S. PATENT DOCUMENTS

2011/0254943 A1    10/2011    Ozinsky et al.
2017/0169567 A1*    6/2017    Chefd'hotel et al. ....................... G06T 7/0012
(Continued)

FOREIGN PATENT DOCUMENTS

CA    3122853 A1    6/2020

OTHER PUBLICATIONS

Kulesa et al., Multispectral fingerprinting for improved in vivo cell dynamics analysis, Sep. 24, 2010 [retrieved Sep. 6, 2024], BMC Developmental Biology, vol. 19, article 101, 15 pages. Retrieved: https://link.springer.com/article/10.1186/1471-213X-10-101 (Year: 2010).*

(Continued)

*Primary Examiner* — Matthew C Bella
*Assistant Examiner* — Dennis Rosario
(74) *Attorney, Agent, or Firm* — Foley & Lardner LLP

(57) ABSTRACT

A method and system are provided for illuminating and imaging a biological sample using a brightfield microscope for the purpose of counting biological cells. The method comprises positioning a sample to be viewed by way of an objective lens of the microscope, the sample comprising a plurality of biological cells; capturing and storing, using an image capturing apparatus, one or more focal image stacks; processing the one or more focal image stacks using a cell localisation neural network, the cell localisation neural network outputting a list of one or more cell locations; determining, using the list of cell locations, one or more cell focal image stacks, each cell focal image stack being obtained from the one or more focal image stacks; processing the one or more cell focal image stacks using an encoder neural network; determining, using the list of cell locations and the list of cell fingerprints, a number of cells within the sample. The present disclosure aims to provide a quick, non-invasive and reliable mode of counting biological cells.

19 Claims, 13 Drawing Sheets

(51) Int. Cl.

| | |
|---|---|
| *G02B 21/06* | (2006.01) |
| *G02B 21/12* | (2006.01) |
| *G02B 27/30* | (2006.01) |
| *G06N 3/02* | (2006.01) |
| *G06N 3/0455* | (2023.01) |
| *G06T 7/73* | (2017.01) |
| *G06T 9/00* | (2006.01) |
| *G06V 10/14* | (2022.01) |
| *G06V 10/70* | (2022.01) |
| *G06V 10/82* | (2022.01) |

(52) U.S. Cl.
CPC ............ *G02B 21/12* (2013.01); *G02B 21/125* (2013.01); *G02B 27/30* (2013.01); *G06N 3/02* (2013.01); *G06N 3/0455* (2023.01); *G06T 7/73* (2017.01); *G06T 9/002* (2013.01); *G06V 10/70* (2022.01); *G06V 10/82* (2022.01); *G06V 20/69* (2022.01); *G06V 20/693* (2022.01); *G06V 20/695* (2022.01); *G06T 2207/10056* (2013.01); *G06T 2207/20084* (2013.01); *G06T 2207/30024* (2013.01); *G06V 10/14* (2022.01)

(58) Field of Classification Search
CPC ......... G06T 2207/20084; G06T 7/0012; G06T 2207/10056; G06T 2207/30004; G06T 2207/30024; G06T 5/60; G06T 2207/10061; G06T 7/73; G06T 9/002; G06V 10/82; G06V 10/70; G06V 10/145; G06V 10/14; G06V 10/141; G06V 10/143; G06V 10/147; G06V 20/69; G06V 20/693; G06V 20/695; G06V 20/698; G06V 10/7715; G06V 40/168; G02B 21/00; G02B 21/12; G02B 21/06; G02B 21/125; G02B 21/08; G02B 6/0001; G02B 21/006; G02B 21/241; G02B 21/244; G02B 26/00; G02B 27/30; G01J 3/0208; G01J 3/0237
See application file for complete search history.

(56) References Cited

U.S. PATENT DOCUMENTS

| | | | |
|---|---|---|---|
| 2019/0384047 A1* | 12/2019 | Johnson | ................. G06N 3/045 |
| 2020/0258223 A1* | 8/2020 | Yip | ......................... G06F 18/21 |
| 2022/0120664 A1* | 4/2022 | Rognin | ............... G06V 20/693 |
| 2024/0169523 A1* | 5/2024 | Tokisue | ............. G01N 15/1433 |

OTHER PUBLICATIONS

Great Britain Search Report on GB appln 2107320.0 dated Mar. 21, 2022.

EPO Search Report on EP Application No. 22173562 dated Oct. 12, 2022 (5 pages).

* cited by examiner

CELL COUNTING METHOD AND SYSTEM

CROSS-REFERENCE TO RELATED APPLICATIONS

This application claims the benefit of Great Britain Patent Application No. 2107320.0, filed May 21, 2021, which is hereby incorporated by reference in its entirety.

FIELD OF THE DISCLOSURE

The present disclosure relates to a method and system for counting biological cells, and particularly to a method and system for counting biological cells using images captured thereof by way of a brightfield microscope.

BACKGROUND TO THE DISCLOSURE

Cell counting is a ubiquitous process occurring in any and all microbiology laboratories which carry out the culturing and monitoring of biological cells in some form or another. There have been many established methods of cell counting, most of which require the agitation and resuspension of cells in an invasive manner which can have both chemotransductive and mechanotransductive effects on cellular processes. The variable and often non-stochastic nature in which cells are handled during such counting techniques can confer artifacts and noise into resulting data which are difficult to control or correct for, and can therefore compound results and conclusions drawn from them.

Making use of a single experimenter for these techniques can often control for biases in the manner in which cells are processed, but such control measures are still not completely effective in eliminating batch effects and artifacts. Additionally, the invasive and sometimes destructive manner of such counting techniques can limit the feasibility and effectiveness of downstream experimentation using the same cells.

Classical methods of cell counting and classification are additionally invariably time intensive, particular at higher sample numbers, and are therefore not suitable for applications which require high sample numbers, those which are time sensitive or those where ongoing experimentation is required for the cells being counted.

While some non-invasive cell imaging techniques are available, many of these techniques have presented issues with accuracy and robustness. In such examples, often the cells being imaged need to still be prepared using some form of semi-invasive preparation process in order to obtain reasonably reliable counts. Such techniques may, for example, still require resuspension of cells in a clear buffer solution, such as saline. These example non-invasive methods also often require other time-consuming method steps such as waiting for the cells to settle, or centrifuging the cells to achieve the same effect—which can of course have mechanotransductive effects on the cells.

Current non invasive and in-situ imaging, wherein the cells remain within their culture vessel, provide even greater issues from a feasibility viewpoint. For example, the variety of surfaces that need to be imaged through means the methods lack robustness to real world conditions.

Cell counting, going beyond a simple provision of "amount of cells", is notoriously tricky to perform accurately in a non-invasive and non-destructive manner. Large magnifications can be used but this typically incurs a large time penalty due to a greater number of required images. Often a trade-off is made to image a smaller sample, which provides a smaller representative of the overall cultured population thus reducing the accuracy.

It is therefore desirable to provide a non-invasive cell counting method which overcomes inherent biases and drawbacks found in existing techniques, and therefore which provides a consistent and reliable cell counting method which permits downstream processing and experimentation using the same cells.

SUMMARY OF THE DISCLOSURE

The present disclosure is directed to a method and system for imaging biological cells for the purpose of cell counting, said cells preferably being cultured on a microplate. The present disclosure makes use of a stack of brightfield microscopy images of a biological sample comprising a plurality of said biological cells, each image of the stack captured at a focal position located within a focal range extending along a z plane positioned perpendicular to an x-y plane of the sample. Such a stack is therefore termed a focal image stack, or z stack. The use of such a z stack of images, each stack captured at various x-y positions across the sample, while providing a cumbersome amount of data, has been found to beneficially avoid the need for refocusing the microscope prior to each image being taken. Such refocusing prior to each image, while reducing the amount of data required, can be a source of unnecessary time, reduction in consistency and standards, and potential harmful mechanical agitation of a sample. Therefore the present disclosure aims to provide a fast, non-invasive method of imaging cells for the purpose of cell counting, which is reliable and consistent.

In particular embodiments, the present disclosure may be directed to a method of illuminating biological cells for the purpose of cell counting using a brightfield microscope. In such embodiments, a sample comprising a plurality of said cells is preferably illuminated using collimated light, preferably using Köhler illumination, for the purpose of imaging said sample using an image capturing apparatus of a brightfield microscope. Collimated light using Köhler illumination, while typically used to provide a desired contrast for viewing a sample of biological cells, has not been considered for its ability to confer upon a digital image of said sample a data profile which has been found to be optimal for downstream computational image analysis for the purposes of cell counting. In fact, such images have been identified to provide particularly noisy data profiles which may dissuade image analysts from making use of this data. Careful assessment of this data has, however, indicated that the data is particularly useful for image analysis when used for the purpose of counting said cells. In preferable such embodiments, the light is monochromatic light which, while perhaps considered suboptimal for the purposes of cell imaging, has been found to limit chromatic aberrations in images which, for the purposes of image analysis would introduce uninformative artifacts into data contained within said images.

Having collimated illumination (in particular the controllability that comes from a Kohler illumination setup) preferably provides a number of benefits.

In particular, when imaging a sample of biological cells cultured in a culture vessel or on a culture surface, for example in a microplate, walls of the vessel or surface often cause reflections and other optical artifacts when light from the brightfield microscope contacts and is reflected and/or refracted therefrom. For the present method, these optical artifacts can be especially hindering when present proximate to or around the edges of the sample. Limiting the illumination to the field of view of the image capturing apparatus, for example using collimated illumination, means that such artifacts are preferably minimised and arise from a light source which is simplistic to model (for image analysis purposes). The reduced variation in such artifacts means that they impart less compounding weight or computational overhead on any required modelling and/or image analysis as part of the present method.

Cell culture vessels and cell culture surfaces, which can comprise plastics, can have some degree of autofluorescence which can cause optical artifacts in captured images. Embodiments making use of collimated light to illuminate the sample, optionally using a Köhler illumination setup, preferably minimises the amount of said light and thus minimising any corresponding artifacts. In some embodiments, if the light illuminating the sample is not collimated, different paths lengths through a "clear", transparent or translucent culture vessel material, such as plastic, can cause said artifacts.

Collimated light in particular may also be preferable from a contrast perspective, which provides improved clarity and definition when imaging many cells across multiple focal planes.

Additionally balancing the needs of a short exposure time, for example to reduce blurring during the imaging motion, and a long exposure time, for example to ensure that a camera sensor is able to gather images of a with a suitable signal to noise ratio, has historically been difficult. In embodiments of the present method, being able to control the illumination field intensity as discussed using collimated light and/or using a Köhler illumination setup, preferably introduces a further variable to allow for a better ratio of exposure to intensity to be found and used.

When combined, z-stacking of images captured of a sample illuminated using collimated light by Köhler illumination as described herein provides an optimal platform for counting biological cells. Such a platform enables fast and non-invasive cell counting in a manner which is computationally efficient. The z-stacking preferably provides robustness to focal plane invariance and the simple illumination setup preferably provides a reduction in setup time, which can be crucial for time-sensitive applications.

Preferable embodiments of the disclosure couple a velocity of the objective lens of the microscope across the focal range, with a frame rate of an image capturing apparatus capturing the images, such that each image of the focal stack is captured at one of a plurality of predetermined focal positions along the focal range, each adjacent of the focal positions being separated by a predetermined distance. In preferable embodiments, a focal metric is used to determine an optimal focal position of an image stack, which may be used to inform the positioning of a focal range of a subsequent focal image stack. A preferable advantage of downstream processing involved in the present method means that the focal metric used does not need to perfectly identify a focal plane within which all cells within a particular sample region are optimally located for imaging (since cells within said region may be best visible from within different focal planes) but, the focal metric preferably allows the focal sweep performed by the objective lens across the focal range to contain the desired biology or biological markers used to determine a cell location in downstream, analysis.

In accordance with a first aspect of the present disclosure, there is provided a method of counting biological cells using a brightfield microscope, the method comprising the steps of, by a processing device: a. positioning a sample to be viewed by way of an objective lens of the microscope, and on an x-y plane at an x-y position of a plurality of x-y positions, the sample comprising a plurality of biological cells; b. capturing and storing, using an image capturing apparatus, one or more focal image stacks, each said focal image stack comprising a plurality of focal images of the sample positioned at the x-y position, each of the focal images in the focal image stack being captured at a different focal position of a plurality of discrete focal positions within a focal range, the focal range being located on a z plane perpendicular to the x-y plane; c. processing the one or more focal image stacks using a cell localisation neural network, the cell localisation neural network outputting a list of one or more cell locations, each said cell location corresponding to a cell characteristic determined by the cell localisation neural network; d. determining, using the list of cell locations, one or more cell focal image stacks, each cell focal image stack being obtained from the one or more focal image stacks; and e. processing the one or more cell focal image stacks using an encoder neural network, the encoder neural network outputting a list of cell fingerprints, each said cell fingerprint corresponding to a cell of the plurality of biological cells; f. determining, using the list of cell locations and the list of cell fingerprints, a number of cells within the sample.

The term "encoder network" will be understood by the skilled addressee to mean any suitable encoder network or autoencoder network.

In some embodiments, the method preferably further comprises the step of: g. processing the list of cell fingerprints using a classification neural network, the classification neural network outputting a cell classification of each cell fingerprint of the list of cell fingerprints.

In some embodiments, the cell classification is preferably determined by the classification neural network by one or more of: calculating a distance between two said cell fingerprints; comparing said cell fingerprints with a database of known cell fingerprints; supervised or unsupervised clustering of said cell fingerprints.

Embodiments will be appreciated wherein non-network (without the use of a neural network) methods of classification may be used directly on the fingerprint(s) or output tensor(s) of the encoder neural. Statistical clustering methods may be used, such as k-means, or hierarchical clustering, to split or divide the dataset into identifiable clusters. A distance metric used for such clustering is preferably Euclidian, although this could be another suitable distance metric as will be appreciated by the skilled addressee. The ideal distance metric is related to a training algorithm used in the respective neural network. Embodiments may employ, as part of the classification process described, comparisons between one said fingerprint and many or many-to-many. Statistics from this can preferably provide metrics for population variation and stability when time points of said fingerprints are considered.

In some embodiments, the cell classification is preferably a determinant of one selected from the group: alive cell; dying cell; dead cell; cell type; cell life cycle stage; cell differentiation stage; cell size; cell shape; biomarker type.

In other examples, population variation may be used by establishing outliers from an average, which can preferably give insight into culture stability of a sample. Statistical clustering methods may separate out fingerprinted cells of the sample into the most distinct clusters within the population (in accordance, for example, with the most effective determinants of variation within the sample), which can typically be live and dead status for two fingerprint/cell clusters. When using a further classification network, a similarity metric corresponding to a similarity between cells can be identified and used a categorisation metric. Otherwise, simple distance metrics against a set of known fingerprints can optionally be used to the same effect, with a preferable benefit thereof being quicker and/or no training of networks involved (but may not be as accurate as other techniques described herein)

In preferable embodiments, unsupervised training (or semi-supervised training) of the (auto)encoder neural network means that the network can identify the features it learns in order to produce a cell fingerprint. The encoder neural network preferably learns to compress the z stack of images (focal image stack) for a particular cell or cell region and recreate said z-stack. This process preferably means that the network converges upon whatever functions are necessary in order to perform said recreation. Initial convolution layers of the network preferably identify edges, points, and/or gradients. Further layers of the network preferably encapsulate higher order features. In preferable embodiments, the network is therefore encouraged or biased toward learning features which transcend simply visual/visible queues, meaning that less visibly apparent features in relation to cell properties, beyond simply "cell shape" and "cell size" for example, can be identified within the fingerprint.

Embodiments will be appreciated wherein the cell classification is any suitable classification related to determining a distinguishing property of a biological cell.

In some embodiments, step b. preferably comprises one or more of the steps of: b-i. positioning the objective lens of the microscope to view the sample at the x-y position, and at a first focal position of a plurality of focal positions, the plurality of focal positions being located on a z plane perpendicular to the x-y plane; b-ii. capturing, using the image capturing apparatus viewing the sample by way of the objective lens, a first focal image of the sample; b-iii. storing the first image within a focal image stack located on a memory, the focal image stack corresponding to the x-y position; b-iv. repositioning the objective lens to view the sample at the x-y position, and at a subsequent focal position of the plurality of focal positions; b-v. capturing, using an image capturing apparatus, a subsequent focal image of the sample; b-vi. storing the subsequent focal image within the focal image stack; and b-vii. repeating steps b-iv. to b-vi. for each subsequent focal position of the plurality of focal positions.

In some embodiments, step b preferably further comprises the step of: b-viii. repeating steps a. to b-vii. for each subsequent x-y position of the plurality of x-y positions to provide a corresponding focal image stack for each said x-y position.

In some embodiments, step c. preferably comprises one or more of the steps of: c-i. receiving, by an input layer of the cell localisation neural network, the focal image stack; c-ii. normalising, by the cell localisation neural network, per pixel data of each image within the focal image stack to a floating point number between 0 and 1 to provide a three dimensional image stack tensor; c-iii. generating, by one or more hidden layers of the cell localisation neural network, a segmentation mask using the image stack tensor, the segmentation mask labelling one or more cell locations according to the determined cell characteristic; c-iv. outputting, by an output layer of the cell localisation neural network, the list of the one or more cell locations.

Per-pixel data received from the image capturing apparatus (camera) is preferably in the form of an integer with a given bit length. The bit length is preferably either 8 bit or 10 bit depending on a visualisation mode of the image capturing apparatus, which may be predetermined or selectable by a user. The integers are then preferably normalised to provide a per-integer value between 0 and 1 for the cell localisation neural network. The normalised per-integer value is preferably a 16 bit floating point number for performance reasons. It will be appreciated that whether this particular list of pre-processing steps are performed by the cell localisation neural network, as a separate component prior to the network, or by any combination of input layer or first hidden layers of the network, can vary across embodiments and the present disclosure is not intended to be limited to a particular order or component for performing these steps.

In most preferable embodiments, the cell localisation neural network is a segmentation network, or comprises segmentation network functionality, such that an output thereof is, or corresponds to, a segmentation mask, which is preferably a binary mask. Connected components labelling may be used to identify each cell according a particular cell identification criteria, cell characteristic, or image characteristic, and in preferable embodiments a centre of each connected component used to calculate the cell centre. In most preferable embodiments, the cell localisation neural network may be trained to label the cell centre pixel, meaning that the cell pixels groups remain distinct. Embodiments will be appreciated wherein any suitable cell identification criteria or cell or image characteristic are used to identify a cell, such as centre of gravity for example.

In some preferable embodiments, the focal range is selected from between 100 μm and 500 μm.

In particular preferable embodiments, the sample is comprised within a first well of a plurality of wells of a microplate, and wherein the focal range for a first focal image stack of a plurality of focal image stacks for said first well is 500 μm.

In some embodiments, the method preferably further comprises the steps of, immediately prior to capturing each subsequent focal image stack to a first focal image stack of a well: processing, by a processor (optionally a GPU), each image of a closest previous focal image stack to determine or retrieve a focus metric for said image, the focus metric defining an extent to which the sample is in focus in said image; identifying, by the processor, an optimal focal position along the focal range of said closest previous focal image stack, the optimal focal position being a focal position of a focal image of the closest previous focal image stack along the corresponding focal range having a peak said focus metric; and setting, by the processor, a focal range of said subsequent focal image stack to 100 μm located about the identified optimal focal position.

In particular embodiments, every image or frame from a focal image stack that arrives at the processor (preferably a GPU) is processed and a focus metric thereof is determined. Once a whole focal image stack has arrived, the frame having the best said focus metric is regarded as being positioned in an optimal focal plane/position and/or centre position of a focal range of a subsequent focal image stack. This optimal focal plane or centre is preferably stored in a lookup table or dictionary. The optimal focal plane or centre position for the subsequent focal image stack (or z stack), or focal range thereof, may therefore be computed according to the said centre position of the nearest already-scored z stack(s) or an average of multiple said centre positions.

In some embodiments, the method preferably further comprises one or more of the steps of, immediately prior to capturing a first focal image stack of a subsequent well to the first well: processing, by the processor, the optimal focal positions of the focal image stacks of the closest previous well to determine a mean optimal focal position for said first focal image stack; and setting, by the processor, a focal range of said first focal image stack to 200 µm located about the mean optimal focal position.

The processor is preferably a highly-parallel processor such as a GPU. The present method preferably provides high-speed stack imaging whereby the focal plane of each image is continuously monitored and adjusted to minimise the corresponding focal range of each focal image stack, and therefore the number of images required to be captured.

In some embodiments, a general purpose GPU (GP-GPU) may be used. Embodiments may be appreciated wherein any highly parallel or stream processor is used. The processor ideally is extremely quick to process the focal image data such that there is no requirement to wait for the nearest z stack optimal focal position to be computed before capturing a subsequent z stack, which ideally occurs in less than half a second.

In some embodiments, the focus metric is preferably a variance score of said image, wherein the variance score is determined by: convolving a variance filter across a matrix of pixel values of the image to provide a variance image; and applying a reduction function to the variance image to provide a single variance score for the image.

Embodiments may be appreciated wherein edge detection convolution is also, or alternatively, performed to provide an image-wide sum as, or as part of, the focus metric. Embodiments will be appreciated wherein any suitable score or value is used to determine a level of focus (focus metric) of images within the focal image stack, and a simple neural network may be used wherein the necessary computation is performed in the two layers. Speed of processing is therefore preferably a priority for any method steps used.

An optimal focal position/plane/centre is preferably determined from focus metrics, such as from variance scoring or edge detection convolution, based on a peak of graphed said metrics, but any suitable method may be used, such as a maximum score/metric for the corresponding focal image stack.

In some preferable embodiments, a velocity of movement of the objective lens along the focal range is set according to frame rate of capture of the image capturing apparatus, such that a desired frame to frame distance of movement of the objective is achieved between each said captured image of a focal image stack. In some embodiments, said frame to frame distance of movement is preferably approximately 4 µm across said range.

Embodiments will be appreciated wherein the frame to frame distance is any suitable distance, and may for example be determined according to the velocity of movement of the objective lens in combination with an operational frame rate of the image capturing apparatus. In order to minimise time spent performing an imaging of the sample, the operational frame rate is preferably a maximum frame rate of the image capturing apparatus.

In some embodiments, the objective lens preferably has a magnification of one selected from the group: 4×; 10×; 40×; 50×. A magnification of 40× or 50× is preferably necessary for bacterial cell imaging. The overall magnification is preferably a result of the combined magnifications of objective and tube lenses of the brightfield microscope. When the field of view of the sample is projected onto the image capturing apparatus (camera) sensor, the intention of preferable embodiments of the present method is to be able to image cells of the sample such that enough image data is obtained to classify the cells, whilst at the same time keeping the field of view as large as possible so that imaging can be quick. The resulting microns per pixel ratio is preferably how the optics are configured. For context, for larger cells 1.5 µm per pixel has been identified to perform favourably (4×), and for smaller eukaryotes (e.g. yeast), 0.75–1 µm has been identified as favourable (10×).

Bacterial imaging preferably requires submicron resolution to provide enough image data for the determination of meaningful fingerprints for the present purposes. In this situation, the present method preferably exceeds the optical resolution limit for a traditional light microscope. Blue or UV light is preferably used in such cases since it has a shorter wavelength, and the optics of the microscope can remain the same across other application (apart from the required light source—e.g. LED—and objective lens). Around approximately 200 nm has been identified as being a lower limit for this purpose. Any brightfield microscope that can provide pixels of 200 nm up to approximately 1.5 µm resolution is therefore preferable for embodiments of the present method. An infinity-corrected optics setup is preferably used, because the objective lens can be actuated without having to move the rest of the optics, camera and tube lens which preferably remain stay still and in focus during operation.

In some embodiments, the brightfield microscope is preferably arranged to illuminate the sample using collimated light. In some embodiments, the brightfield microscope is preferably arranged to illuminate the sample using Köhler illumination. Embodiments will be appreciated wherein any suitable mode of illumination is used.

Köhler illumination is preferably used to provide even and nearly collimated light. It will be appreciated that the light may never be perfectly collimated, when originating from a non point source. It will be appreciated that the term "collimated light" in the context of the present disclosure takes into account this inherent limitation with some applications and is not intended to exclude said applications. Köhler illumination preferably allows for configuration of even intensity and controllable field of view, and also preferably allows a light source of the brightfield microscope (such as an LED) to be changed in a modular manner. A laser may be used in some embodiments, may provide improved collimation, but a reduced variety of lasers comparable with other suitable light sources may make lasers less favourable when compared with, for example, an LED, and the intensity field thereof has been found not to be even, which may require less-favourable further configuration.

In some embodiments, the brightfield microscope is preferably arranged to illuminate the sample using monochromatic light. In some preferable embodiments, the monochromatic light is provided by a monochromatic light source, for example a monochromatic LED. The monochromatic light in preferable embodiments is red light, specifically when said embodiments requiring optimal contrast. In alternative embodiments, wherein the light source is optimised for imaging comparably small cells, as discussed herein, the monochromatic light may be blue light, or light within, or just within, the UV spectrum (a portion thereof proximate the visible light spectrum, distal to the x-ray spectrum). The term "monochromatic" will be understood by the skilled addressee to mean "light having wavelengths limited to those of a specific colour" or a limited to a narrow wavelength range (such as for example wavelengths within a range of 0 to 100 nm), and optionally, "light having a single wavelength". A monochromatic light source preferably avoids chromatic aberrations in the resulting captured images, and can provide a simpler component arrangement and therefore easier and more cost effective manufacture. Embodiments will be appreciated wherein any suitable light source is used.

In accordance with a second aspect of the present disclosure, there is provided a system for illuminating, imaging and counting biological cells, the system comprising:
a brightfield microscope comprising:
a moveable stage member arranged to support a cell culture device on an x-y plane, the cell culture device comprising a sample of biological cells;
an illumination member arranged to illuminate the sample;
a moveable objective lens arranged to magnify the illuminated sample;
an image capturing apparatus arranged to capture an image of the magnified sample; and a processing device having code portions stored thereon, the code portions arranged when executed by a processor of the processing device to perform a method in accordance with the first aspect.

In accordance with a third aspect of the present disclosure, there is provided a use of z-stack imaging for counting biological cells, wherein the z-stack imaging comprises capturing a plurality of images of a sample located on an x-y plane and comprising a plurality of biological cells, each of the plurality of images captured at a different focal position along a focal plane oriented perpendicular to the x-y plane.

It will be appreciated that any features described herein as being suitable for incorporation into one or more aspects or embodiments of the present disclosure are intended to be generalizable across any and all aspects of the disclosure.

DETAILED DESCRIPTION

Embodiments of the present disclosure will now be described by way of example only and with reference to the accompanying drawings, in which.

The present disclosure relates to counting biological cells cultured in any suitable culture environment permitting imaging using a brightfield microscope. While preferable embodiments make use of cells cultured in monolayer culture, embodiments of the present disclosure will be appreciated wherein the cells are cultured using any suitable culture method, such as a suspension culture, a (nearly) transparent or translucent three-dimensional cell culture, a solid or semisolid media, or tissue section. Most preferable embodiments of the present disclosure are suitable for use with cells cultured in a microplate, for example a microplate having any number of wells (for example a petri dish, 6, 12, 24, 96 or 384 wells), wherein each well comprises an optically clear lower surface suitable for supporting a culture of cells.

Figure 1A:
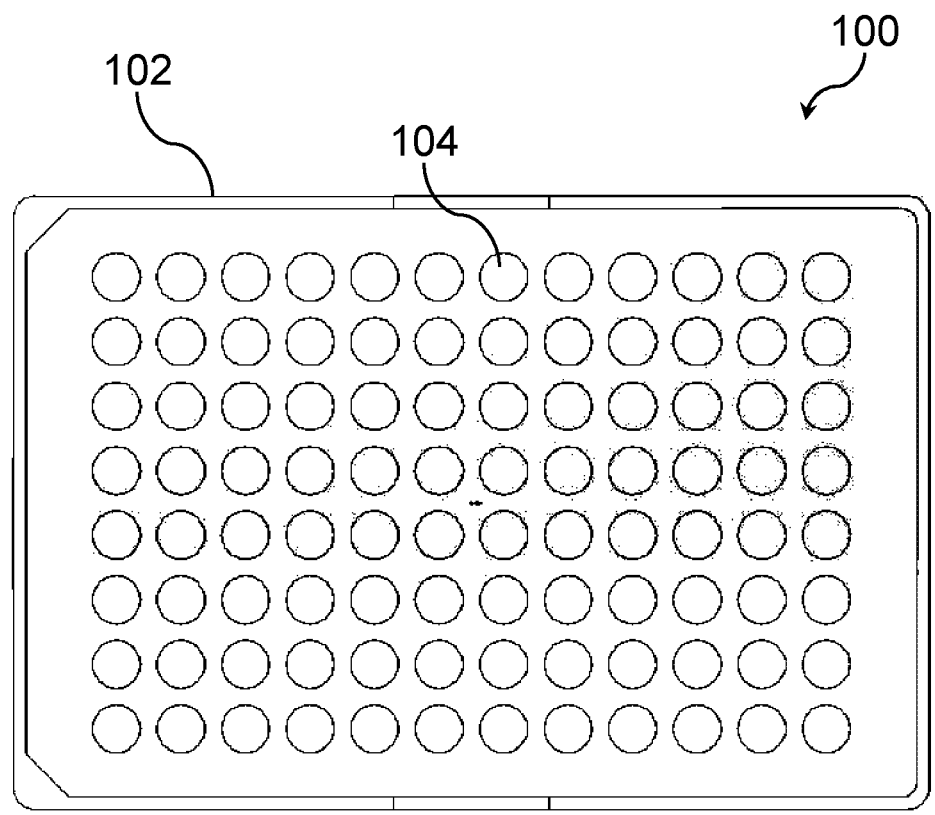
FIG. 1A shows a perspective view of a 96-well microplate.
Figure 1B:
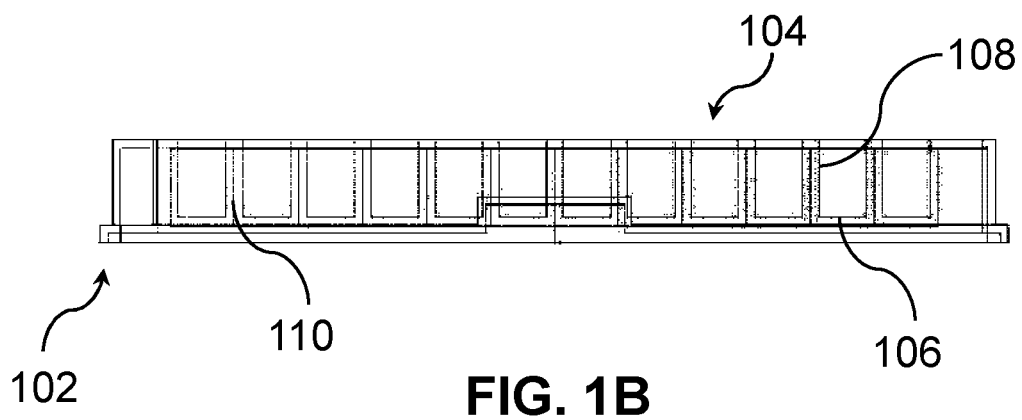
FIG. 1B shows a side view of the microplate.

With reference to the presently-described example, FIG. 1A and FIG. 1B show a 96-well microplate 100, suitable for use in embodiments of a method of counting biological cells in accordance with an aspect of the present disclosure. The microplate 100 comprises a base 102 formed from transparent polystyrene, the base having ninety six flat-bottomed wells 104 formed therein. The flat-bottomed wells 104 form a planar lowermost surface 106 providing a sample region, which in some embodiments is suitable for accepting biological cells (not shown) adhering thereto. Some such versions of a microplate may be coated, for example using collagen, to facilitate said cell adhesion. Other embodiments will be appreciated wherein the biological cells are non-adhesive cells and are present in the microplate as a suspension culture. The wells 104 of the microplate 100 comprise a wall 108 extending therefrom. An inter-well region 110 is defined between adjacent well walls 108. The microplate 100 further comprises a lid (not shown) suitable for placing over the wells 104 of the microplate 100 while permitting gaseous transfer to and from the wells 104. In embodiments of the present disclosure, dimensions of the cell culture environment used are known. Example such dimensions may include: microplate well diameter, depth and volume; pitch (taken to be a distance between adjacent wells, or inter-well distance); well shape; a thickness of a lower surface 106 or sample region of the microplate wells 104; and well positions on the microplate.

Figure 2:
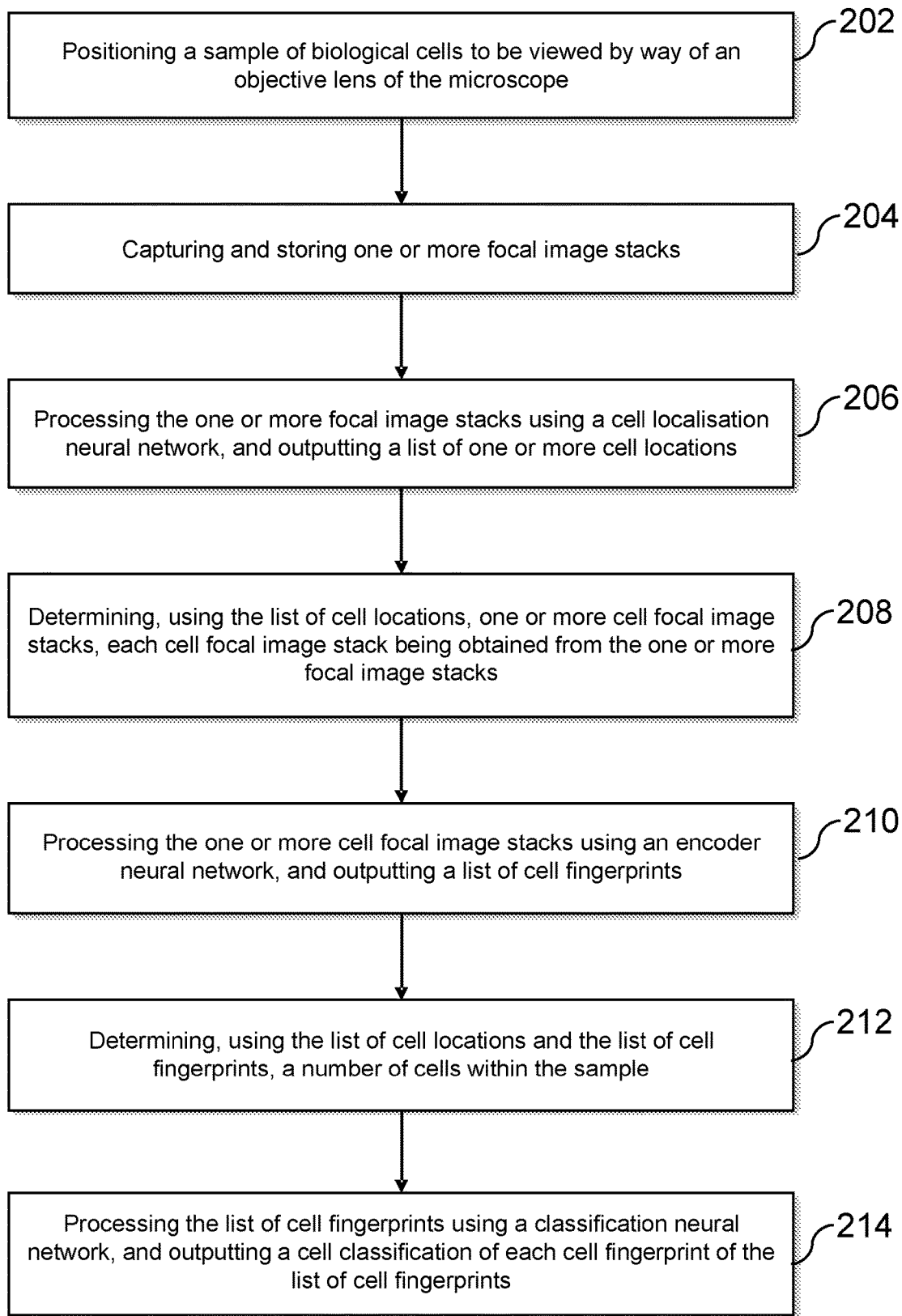
FIG. 2 depicts of a flowchart outlining steps of an example embodiment of a method of counting biological cells cultured in the microplate of FIG. 1A and FIG. 1B using a brightfield microscope, in accordance with the first aspect of the present disclosure.

Referring to FIG. 2, a flowchart is shown providing steps of an example embodiment 200 of a method of counting biological cells using a brightfield microscope in accordance with the present disclosure. The method comprises the steps of, by a processor of a processing device:
positioning a sample to be viewed by way of an objective lens of the microscope 202;
capturing and storing, using an image capturing apparatus, one or more focal image stacks 204;
processing the one or more focal image stacks using a cell localisation neural network and outputting a list of one or more cell locations 206;
determining, using the list of cell locations, one or more cell focal image stacks, each cell focal image stack being obtained from the one or more focal image stacks 208;

processing the one or more cell focal image stacks using an encoder neural network and outputting a list of cell fingerprints 210;

determining, using the list of cell locations and the list of cell fingerprints, a number of cells within the sample 212;

processing the list of cell fingerprints using a classification neural network, and outputting a cell classification of each cell fingerprint of the list of cell fingerprints 214.

The step of positioning a sample of biological cells 202 involves positioning the sample on an x-y plane at an x-y position of a plurality of x-y positions. In the step of capturing and storing the focal image stacks 204, each said focal image stack comprises a plurality of focal images of the sample positioned at the x-y position. Each of the focal images in the focal image stack is captured at a different focal position of a plurality of discrete focal positions within a focal range, the focal range being located on a z plane perpendicular to the x-y plane. In the step of processing the focal image stacks and outputting the cell locations 206, each cell location in the embodiment described corresponds to a cell centre determined by the cell localisation neural network, and described in more detail in relation to FIGS. 11 and 12.

Figure 3:
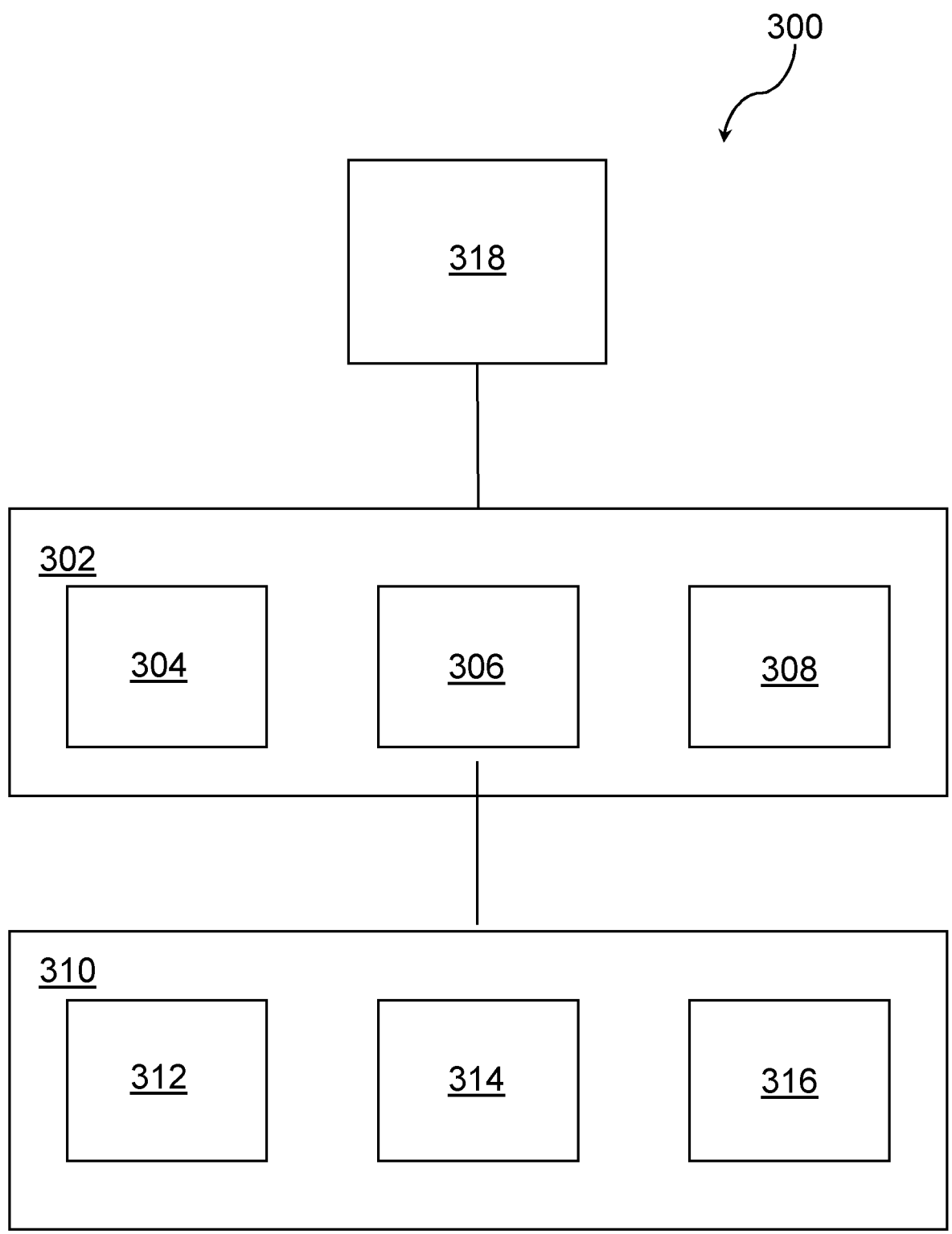
FIG. 3 shows a simplified block diagram showing components of an example embodiment of a system in accordance with the second aspect arranged to perform the method of FIG. 2.
Figure 4:
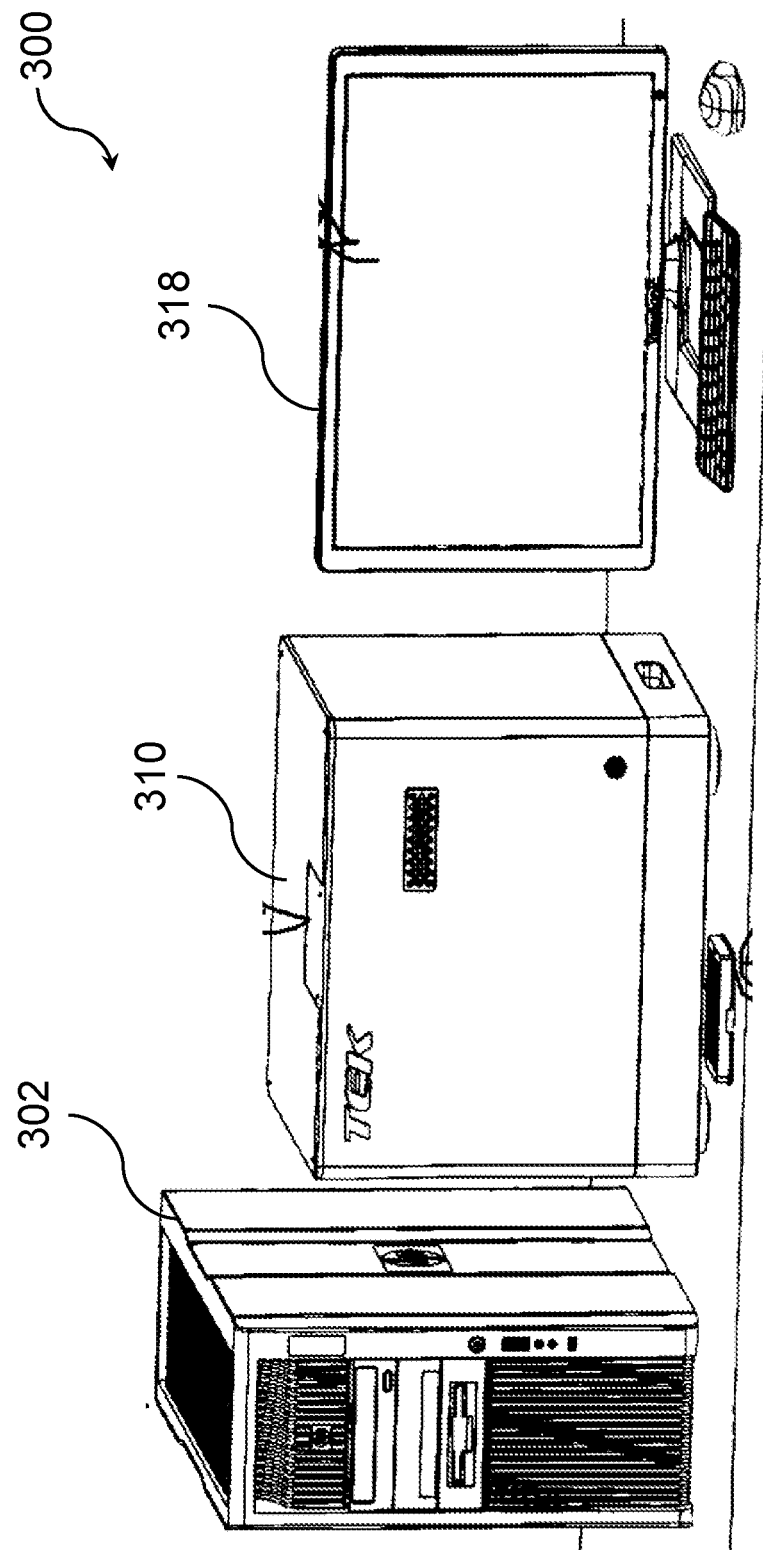
FIG. 4 shows a perspective view of the example system shown in FIG. 3.

Referring to FIG. 3 and FIG. 4, an example embodiment of a system 300 in accordance with the second aspect of the present disclosure is shown. The simplified block diagram of FIG. 3 identifies the core elements of the system 300 used to perform the method steps of the example method 200 of FIG. 2. FIG. 4 provides a perspective view of the example system 300 in position for performing the method 200.

The system 300 comprises a computing device 302 having a central processor (CPU) 304, a graphical processor (GPU) 306, and a memory 308 having software code portions stored thereon and arranged to be executed by the CPU 304 and/or the GPU 306. The computing device 302 is communicatively coupled to an imaging unit 310 housing a brightfield microscope having a moveable stage member 312 arranged to support a microplate 100 on an x-y plane. The moveable stage member 312 is arranged to be moved across the x-y plane in order to reposition the microplate at one of a plurality of x-y positions on the x-y plane. The imaging unit 310 further comprises an illumination member 314 arranged to illuminate a biological sample cultured in the microplate, and a magnification member 316 comprising a moveable objective lens arranged to magnify the illuminated sample and an image capturing apparatus arranged to capture an image of the magnified sample. The moveable objective lens is arranged to move along a z plane, perpendicular to the x-y plane, across a focal range. The computing device 302 is further communicatively coupled to a display device 318, which in the embodiment 300 shown is a display monitor arranged to display an output of the computing device 302 and/or the imaging unit 310.

Figure 5:
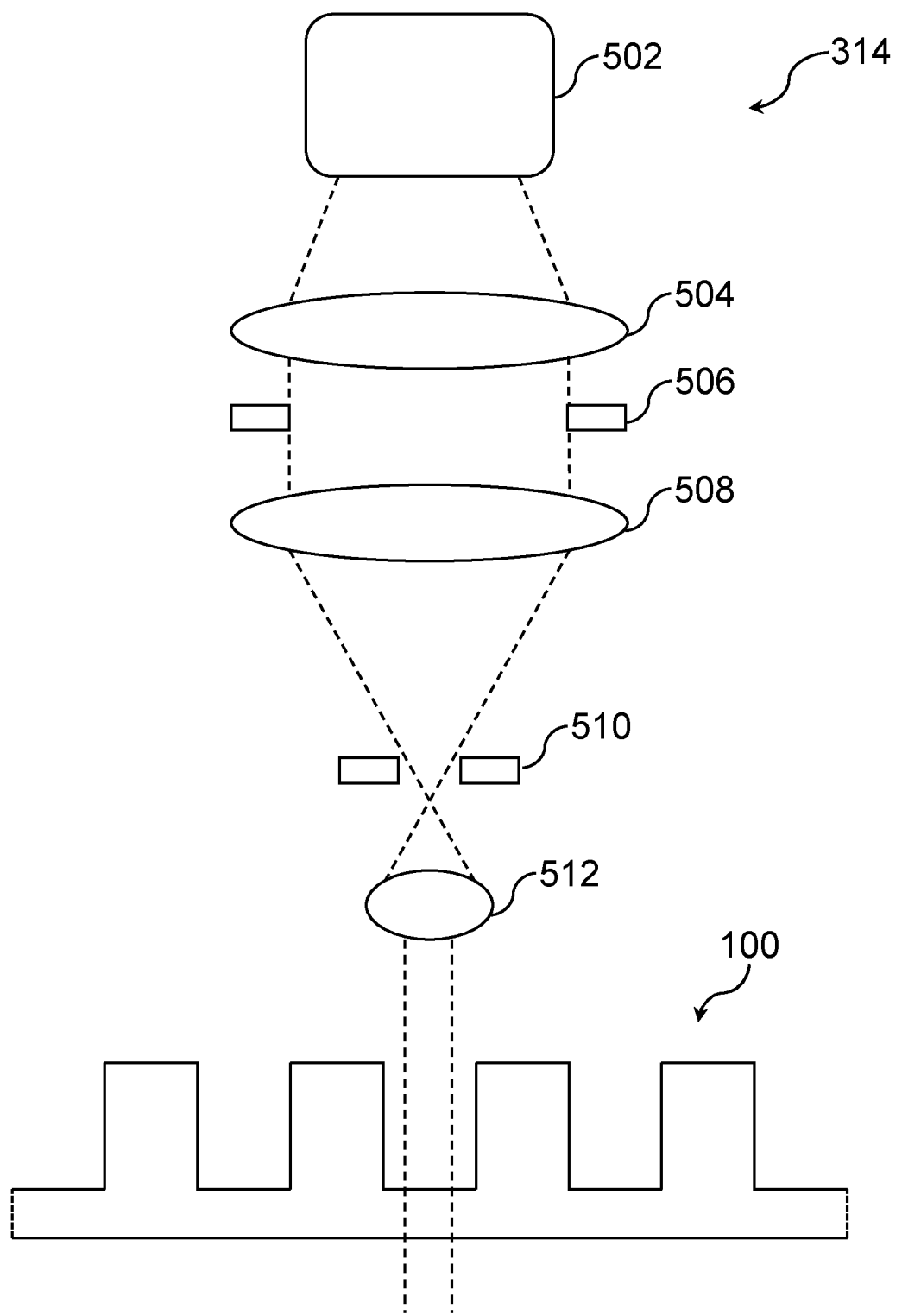
FIG. 5 shows a simplified block diagram of a brightfield microscope illumination system of the system of FIG. 4, to be used in the method of FIG. 2.
Figure 6:
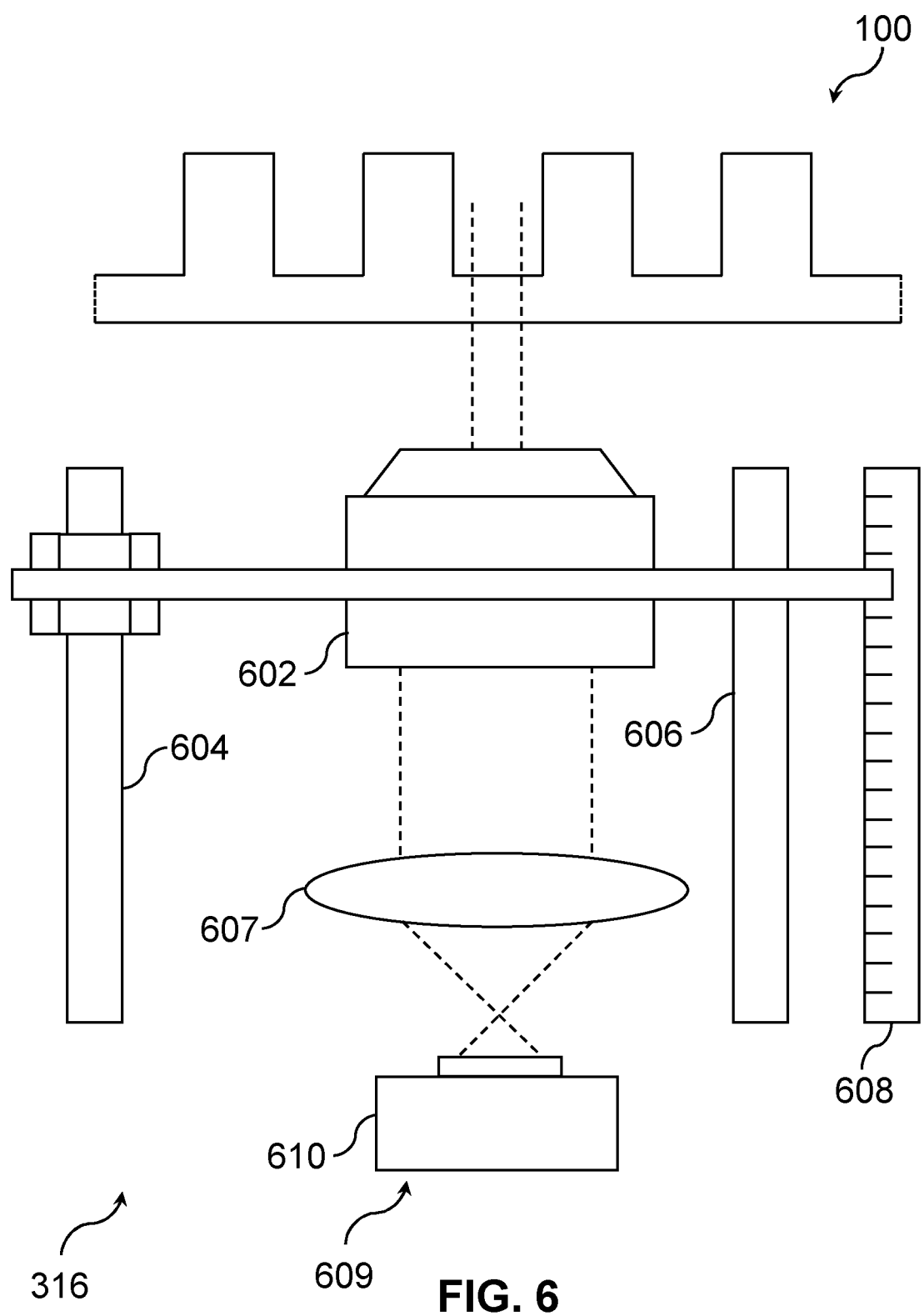
FIG. 6 shows a simplified block diagram of an example brightfield microscope magnification system of the system of FIG. 4, to be used in the method of FIG. 2.

The brightfield microscope of the example system 300 shown is an inverted brightfield microscope, and comprises an imaging system having a top mounted illumination member 314 shown in a simplified form in the block diagram of FIG. 5 and a bottom mounted magnification member 316 shown in a simplified form in the block diagram of FIG. 6. In the embodiment shown, the illumination member 314 comprises a monochromatic light source 502, which in the embodiment shown comprises a red LED 502 arranged to provide the light used to illuminate the sample. Embodiments will be appreciated wherein any suitable light source is used, such as an LED of any colour. A monochromatic light source is preferred in order to reduce chromatic aberrations in the illumination of the sample and to provide a non-complex illumination system. The red LED 502 of the example embodiment shown is a chip-on-board (COB) LED (but examples will be appreciated having a surface mounted device (SMD) LED) having an emission area of 10×10 mm. The LED 502 comprises a power rating of roughly 10 W and is powered by a programmable constant current source. In the embodiment described, the LED power source is a constant current source as current has been found to map to brightness in a more predictable way than voltage does. Additionally, pulse width modulation (PWM) control of the LED is preferably properly smoothed (to essentially that of a linear supply) or the PWM frequency must be sufficiently high as to not cause variation or strobing in the stack images of the focal image stack. Embodiments of the present invention will be appreciated having any suitable light source.

The illumination member 314 further comprises an aspheric condenser lens 504 positioned to receive light from the red LED 502 and collimate the light. The example condenser lens 504 comprises a 600 grit sanded diffusing surface. Collimated light from the condenser lens 504 passes through a 25 mm condenser diaphragm 506 positioned to form an iris to direct light toward a Plano convex collector lens 508 of the illumination member 314. Collimated light from the condenser lens 504 is focused by the collector lens 308 through a second 25 mm diaphragm 510 positioned at the focal point of the collector lens 508 and toward a biconvex relay lens 512. The relay lens 512 is positioned to focus the monochromatic light onto the imaging focal point (the working distance of the objective lens of the microscope, at the centre of its operating range). In the particular example embodiment 300 shown, the illumination member 314 is positioned in a horizontal plane parallel to an x-y plane of the microplate 100 for optimum space efficiency within the imaging device used for the method. Light from the relay lens 512 is therefore reoriented to pass in a z plane perpendicular to x-y plane of the microplate, and through the sample of biological cells toward an objective lens of a microscope, using a mirror.

In the particular embodiment 300 shown and described, the illumination used to illuminate the sample is Köhler illumination. The Köhler illumination preferably provides even illumination of the sample which fills the field of view of the objective lens. It is also important that the illumination is as collimated as possible when passing through the sample.

The idealistic point of collimated and even illumination for the sample is placed at the determined centre point/optimal focal position of the current focal image stack. In the presently described embodiment, and in preferable embodiments of the disclosure, said centre/optimal focal position may change for each subsequent focal image stack the illumination optics are not moved, as the focal plane deviation from the idealistic point is small enough not to cause a significant loss of quality. The mechanics of moving the illumination optics has been found to add extra complexity at little benefit.

In the example system 300, control of the LED light source 502 is performed by the computing device 302 and via a series of trigger lines for high-speed triggering.

The magnification member 316 is positioned below the microplate 100, and comprises an infinity-corrected 10× objective lens 602. Embodiments will be appreciated wherein the objective lens is any suitable objective lens, for example 4×. In the particular example 300 shown, the objective lens 602 is arranged to be moved along a guide rail 604 by voice coil-based movement actuator 606 affixed thereto. Movement of the objective lens 602 is performed using a closed-loop system according to an optical encoder comprising a 50 mm encoder strip 608 having a pitch of 0.5 µm. Embodiments will be appreciated wherein movement of the objective lens 602 is achieved by any suitable movement means.

Positioned downstream of the objective lens 602 is a Plano convex tube lens 607 positioned to focus collimated light received from the objective lens 602 toward a sensor of an image capturing apparatus 609 (a camera). In the embodiment shown, the camera sensor is a monochromatic CMOS sensor comprising a sensor area of 11.25 mm×7.03 mm, and 1920×1200 pixels, which constitutes a large pixel area. The monochromatic nature and large sensor area of the sensor is favourable. Other embodiments will be appreciated wherein the sensor is any suitable sensor. The sensor is accommodated within a Basler ace housing 610 (acA1920-155 µm), which forms a highly configurable camera over USB3, having a maximum capture rate of approximately 160 fps and a configurable pixel resolution of between 8-bit and 12-bit. Internally the camera 609 uses a field-programmable gate array (FPGA) which provides a favourably large amount of configurability. The camera is in electrical connection to the illumination member 314 and the objective lens movement mechanism 604, 606, 608 which act to trigger the camera to capture an image of the light received by the sensor.

As with the illumination member 314 described in relation to FIG. 5, the magnification member 316 is primarily oriented in a plane parallel to the microplate 100 for space efficiency. Light passing through the sample and the objective lens 602 is reoriented in a plane parallel to the microplate 100 using a mirror. All components of the magnification member 316 which are positioned downstream of the objective lens 602 lie along the parallel plane.

The illumination and magnification members 314, 316 comprise a minimal number of moving parts, and once calibrated for performing image capture and storage, the only moving part of the systems is the objective lens 602 moved by the movement mechanism 604, 606, 608 described.

Figure 7:
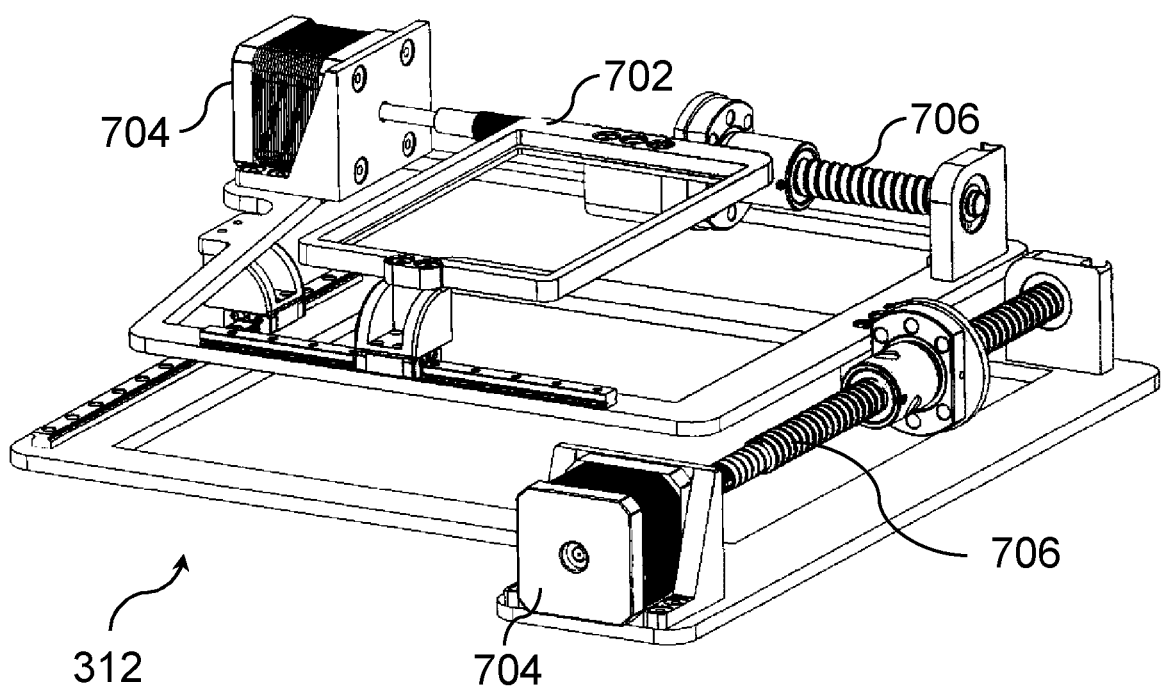
FIG. 7 shows an isometric view of an example microplate guidance mechanism for use in the method of FIG. 2.

Referring to FIG. 7, a perspective view is provided of the moveable stage member 312. The moveable stage member 312 comprises a stage 702 for supporting the microplate 100 on the x-y plane. Once a plate 100 is moved inside the imaging unit 310 and onto the stage 702, the plate 100 is moved to align the plate with the illumination member 314 and the magnification member 316. Therefore the plate 100 itself is moved to align a well thereof with a particular x-y position, rather than the illumination or magnification components moving. Specifically, during operation of the imaging unit 310, the stage member 312 is arranged to move the plate 100 along the x-y plane only.

The moveable stage member 312 further comprises a pair of hybrid stepper motors 704 each coupled to respective ball screws 706 arranged to move the stage 702 in an x direction and a y direction respectively along the x-y plane. The particular stepper motors 704 used in the example 312 shown are 400 steps per revolution motors each having 1000 counts per revolution quadrature encoders, and provide 4000 counts per revolution due to a 4-pulse signature of a corresponding quadrature encoder. The ball screws 706 are 4 mm pitch SFU1204 ball screws, and are constrained at each end by 608ZZ bearings. Limit switches are placed at the motor end of each ball screw 706 and are used to establish an absolute zero position during the initial stage positioning procedure. The stepper motors 704 are each driven by a motion controller controlled by the computing device 302. The motion controllers each drive a corresponding motors 704 via a step direction interface and are configured for 256 micro steps. The motion controllers in the example shown are based around an ARM processor controlled via a GCODE interface over USB connected to the host computer 302. Together the moveable stage member 312 is arranged to move the microplate 100 to one x-y position of a plurality of x-y positions, wherein at each x-y position a well, or a well region, of the microplate 100 is aligned with the magnification member 316. Each x or y axis movement is made with regards to a predefined limit in velocity, acceleration, and jerk (as well as the deceleration equivalents). The computer 302 can control the motion stage (x and y axis) to align any desired well, or well region, of the microplate 100 with the magnification member 316. The x-y positions are predetermined based on the known dimensions of the microplate 100, such that where possible only sample regions are magnified and imaged by the imaging unit 310. Well walls and inter-well regions of the microplate 100 provide light scattering and suboptimal images for cell counting and classification. Therefore the plurality of x-y positions are therefore preferably determined to avoid said well walls and inter-well regions. The system described is designed to scan a full 96-well microplate in around 30 minutes.

The microplate 100 is loaded into the imaging unit 310 by way of a loading door onto the stage. The user can start this process by pressing a button on the front of the imaging unit 310 or starting the scan process in the software of the computing device 302. Once the microplate 100 is loaded, the button is pressed again or the software is used to load the microplate. In the example described, a barcode on the microplate 100 is scanned by a scanner (not shown) of the imaging unit 310. Alternative embodiments may use a non-coded plate or any other tagging or ID means, such as an RFID tag for example. In the example described, if the plate has not been scanned before the user has an opportunity to give the plate a name and determine the wells to be imaged. A date/time and device name is applied in any case. The plate is mechanically pulled into the imaging unit 310 and stabilised in place on the stage, which comprises an un-occluded or transparent bottom in order to permit passage of light and visibility of the sample therethrough.

Figure 8:
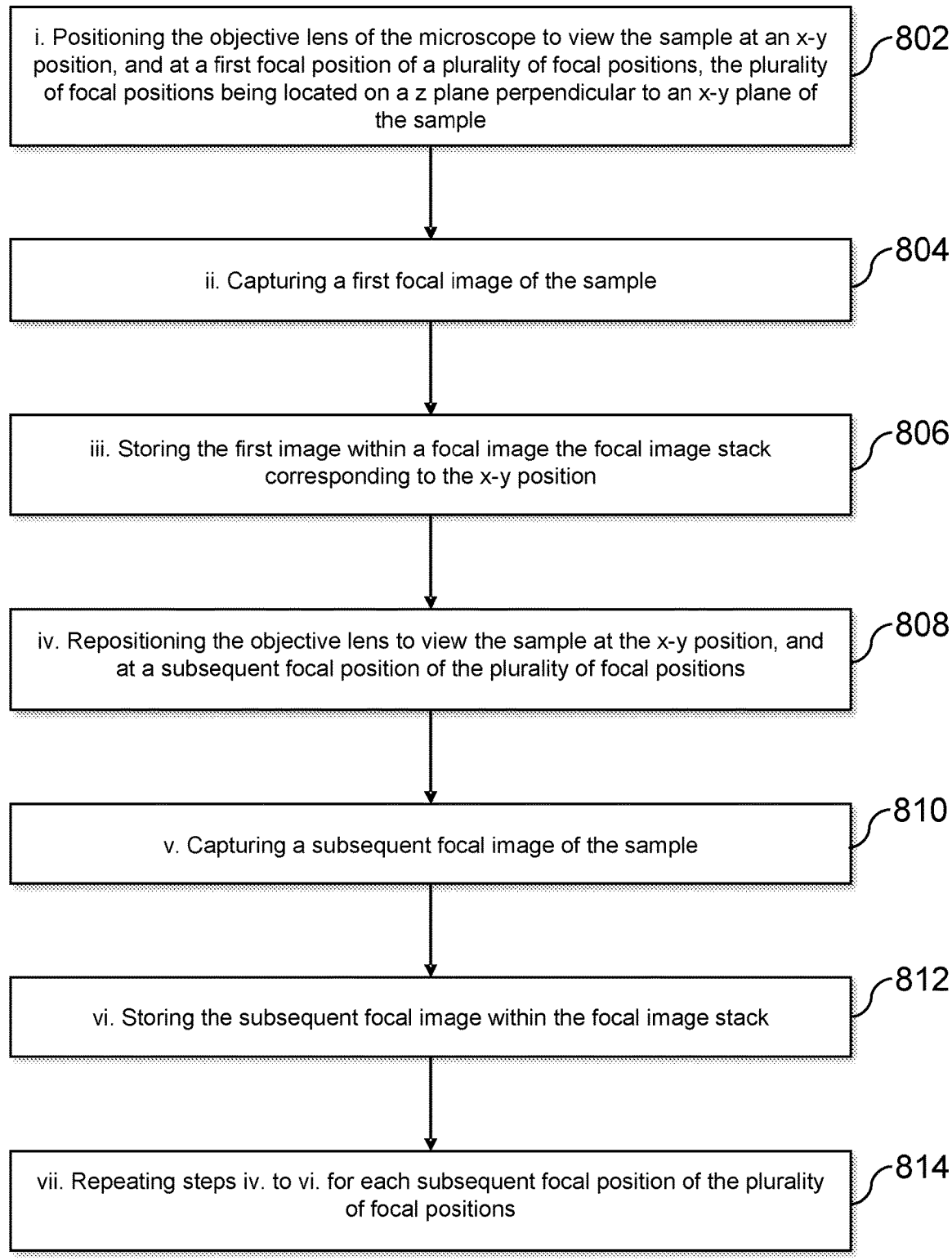
FIG. 8 shows a flowchart outlining additional steps of the example method of FIG. 2, specifically for the generation of the focal image stack of the method of FIG. 2.

Referring to FIG. 8, a flowchart outlining additional example steps 800 of the method 200 is shown, the additional steps forming sub-steps of the step of capturing and storing, using an image capturing apparatus, one or more focal image stacks 204. The additional steps comprise:

i. positioning the objective lens of the microscope to view the sample at an x-y position, and at a first focal position of a plurality of focal positions, the plurality of focal positions being located on a z plane perpendicular to an x-y plane of the sample 802;
ii. capturing a first focal image of the sample 804;
iii. storing the first image within a focal image the focal image stack corresponding to the x-y position 806;
iv. repositioning the objective lens to view the sample at the x-y position, and at a subsequent focal position of the plurality of focal positions 808;
v. capturing a subsequent focal image of the sample 810;
vi. storing the subsequent focal image within the focal image stack 812; and
vii. repeating steps iv. to vi. for each subsequent focal position of the plurality of focal positions 814.

The method steps 800 are performed at each x-y position of the plurality of x-y positions in sequence, each said position preferably providing images of overlapping sample regions within a particular well of the microplate 100. In particular, the computing device 102 is arranged to coordinate all of the components of the imaging unit 310 such that every well of the microplate 100 (or those wells selected by a user) can be imaged. The dimensions of the microplate 100 are known by the computing device 302 and therefore a sequence or queue of said x-y positions are calculated by the computing device 302 accordingly based on known field of view of the camera and axis offsets. In accordance with the method steps 800 of FIG. 8, each x-y position is imaged at multiple focal positions along the focal range, wherein each adjacent x-y position results in an image overlapping an image captured of the adjacent x-y position, by an overlapping area.

The positions are calculated as to minimise imaging outside of the given well. As this introduces light scattering from the well wall. This results in a list of positions for every well.

The moveable stage member 312 moves the stage 702 to assume an origin x-y position at well A1 of the microplate 100. The computing device 302 subsequently calculates the optimal path of movement of the stage 702, and therefore the microplate 100, across the x-y plane via all the well centres (of wells that must be imaged). This calculation is performed using a GPU accelerated OPT-2 algorithm (solving the traveling salesman problem). This is combined with the internal well image positions to produce a queue of wells, each with their own queue of x-y positions, to provide the plurality of x-y positions.

The computing device 302 then triggers movement of the stage 702 to assume the first x-y position in the queue. In the example embodiment shown, a calibration procedure is then performed by the computing device 302, in which the exposure of the image capturing apparatus is set to obtain an ideal brightness for the images to be captured. This permits dynamic adjustment for varying lighting conditions. In preferable embodiments, to avoid the effect of ambient light on the captured images, the imaging unit 310 preferably comprises an opaque housing containing the illumination and magnification components thereof. The computing device 302 then triggers the movement of the objective lens 602 by the movement mechanism 604, 606, 608 as described herein, so that the focal point of the objective lens is aligned with the lowermost surface 106 of the first well (calculated by the computing device 302 from the known microplate dimensions). The red LED 502 is activated and an image is taken by the camera 609 at a given exposure time (around 50 μs for the first image). The pixel values (corresponding to pixel intensity) of the captured image from the camera are then averaged so that an average grey level is calculated by the computing device 302 (from a 30% FOV central window). Using a binary search method, the exposure of the camera 609 is changed iteratively until the exposure is around 30% of the maximum intensity the camera 609 can capture. This will depend on the camera used for the embodiment, with the example embodiment shown being roughly 75 at 8 bits or 1250 at 12 bits. Once this is done the exposure remains constant for the rest of the imaging session. Images captured are subsequently processed by the GPU 306 of the computing device 302. As described, a 30% FOV central window is used for the present embodiment which makes use of red light specifically, but embodiments will be appreciated wherein the central window is any value suitable, and may be based on the wavelengths/colour of light used, or on specific biological parameters of a sample being imaged. The particular central window value aims to maximise the dynamic range of the cells being imaged.

Subsequent to said calibration procedure, every queued x-y position for each well is imaged by way of a focal image stack, otherwise referred to as a z stack. In the embodiment shown, each focal image stack is captured at the maximum frame rate of the camera 609 and with a frame-to-frame distance of 4 μm. This distance has been found to provide the optimal combination of image density and process speed for cell counting, although embodiments will be appreciated where any suitable distance is used. The number of images in a particular focal image stack (and thus the focal range across which the images are captured) varies in the embodiment shown, depending upon the position of the focal image within the focal image stack, and upon the well of the microplate being imaged.

If it is the first focal image stack of the entire microplate 100, a focal range of 500 μm (0.5 mm) is determined by the computing device 302 upwards through the sample from the lowermost surface 106 of the first well. This procedure defines an autofocus procedure based around the corresponding microplate well's theoretical focal point. Larger focal ranges may be used if imaging other types of sample, such as suspensions of cells, but the presently-defined range has been found to be optimal for traditional (and common) two-dimensional monolayer cell culture.

Figure 9:
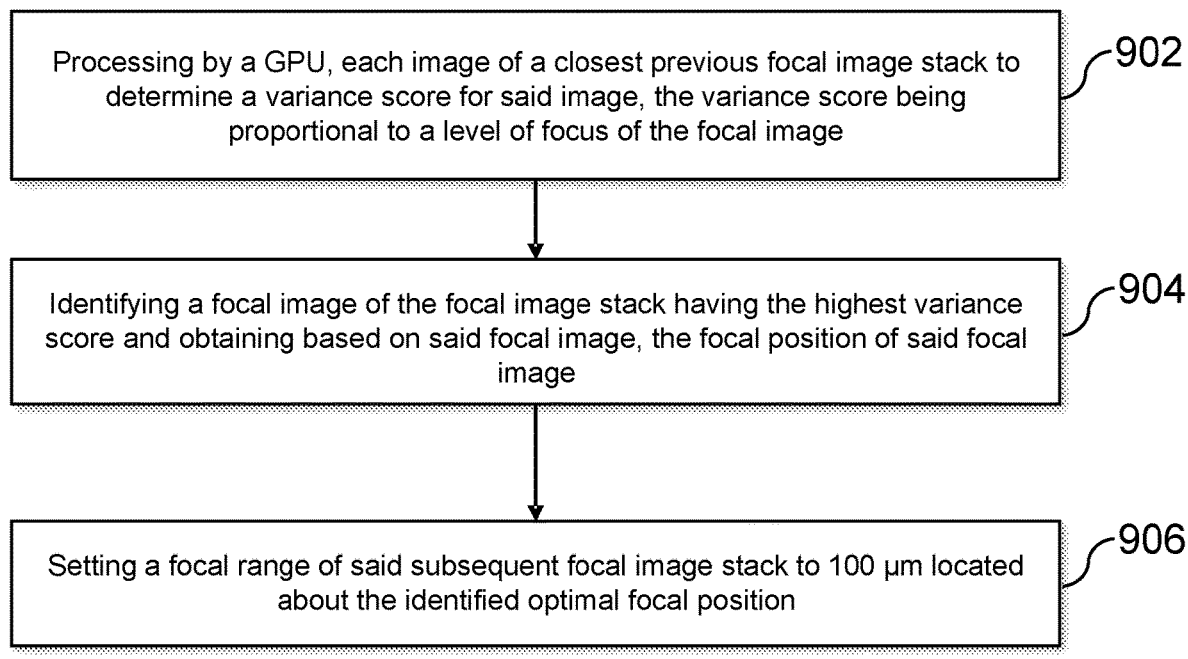
FIG. 9 shows a flowchart outlining additional steps of the example method of FIG. 2, specifically for the determination of optimal focal range for each focal image stack of a well.

For each focal image stack of the first well, subsequent to the first focal image stack of the microplate 100, the focal range for the focal image stack is determined according to the steps 900 outlined in the flowchart of FIG. 9. Specifically the steps include:
  processing by the GPU, each image of a closest previous focal image stack to determine a variance score for said image, the variance score being proportional to a level of focus of the focal image 902;
  identifying a focal image of the focal image stack having the highest variance score and obtaining based on said focal image, the focal position of said focal image 904; and
  setting a focal range of said subsequent focal image stack to 100 μm located about the identified optimal focal position 906.

Figure 10:
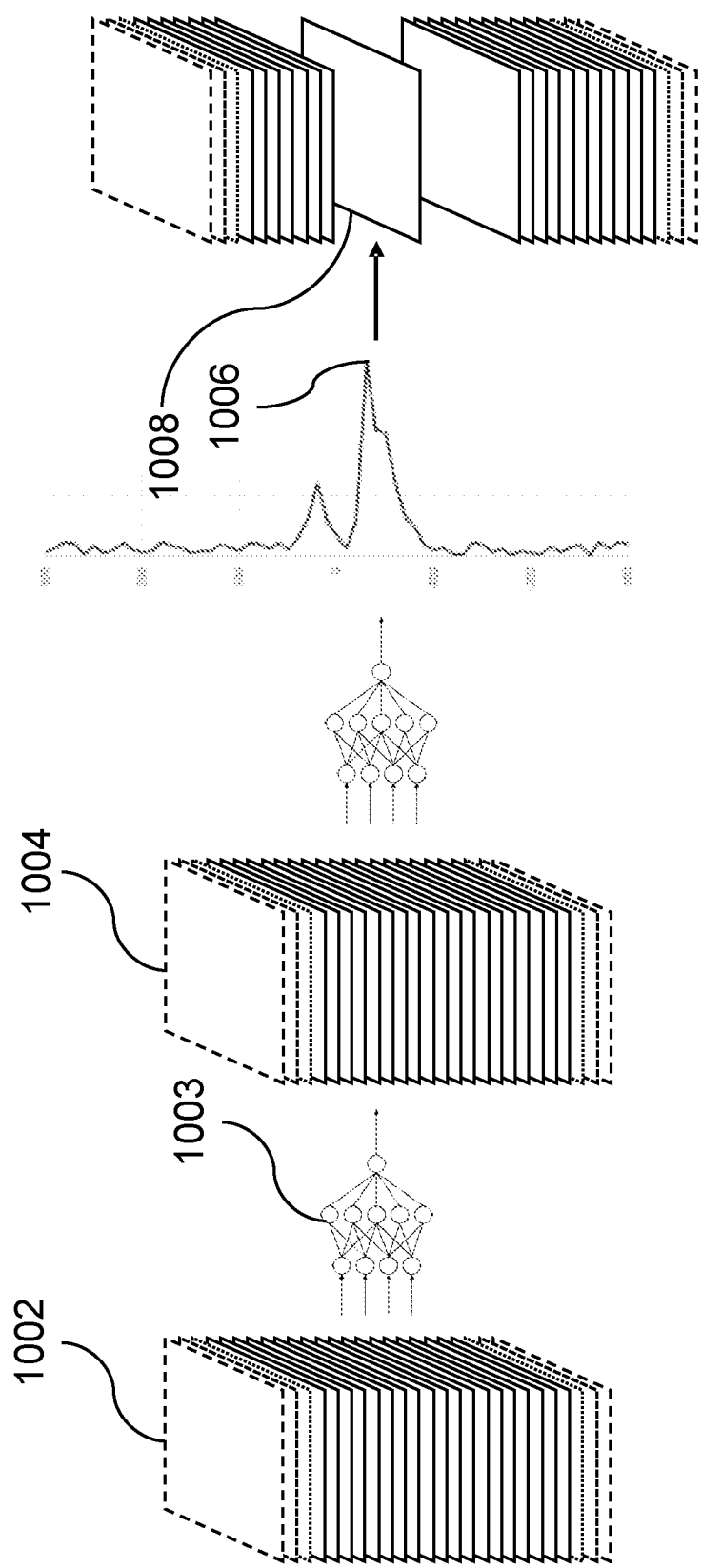
FIG. 10 shows an example scheme for how the optimal focal range of FIG. 9 is determined.

The closest previous focal image stack is determined according to the x-y position of the previous focal image stack which is closest (using Euclidean distance) to the current x-y position. The variance score is a metric used to determine a level of focus of an image, with variance being used as proportional to level of focus and is determined according to the steps depicted in FIG. 10. Specifically, a variance filter is convolved across each image of a focal image stack 1002 by the cell localisation neural network 1003, to provide a variance image stack 1004. In the embodiment shown, the variance image stack 1004 is obtained using the function of:

$$S^2 = \frac{\sum (x_i - \bar{x})^2}{n-1}$$

which is applied using a 3×3 kernel across each image of a focal image stack 1002 to provide a corresponding variance image. A reduction function of:

$$\Sigma S_f$$

is then applied to each said image to yield the variance score for the image (which in the present example represents a whole image sum of local pixel variance scores), from which the GPU 306 is arranged to determine a peak variance score 1006 corresponding to a most focused image 1008 of the focal image stack 1002. The focal position along the focal range of the focal image stack 1002 is then determined by the GPU to be the optimal focal position about which the focal range of the subsequent focal image stack of a well is determined. Thus a simple focal finding method is performed which is relatively non-computationally intensive and can therefore be performed quickly. Other focal finding methods may be appreciated.

For each well subsequent to the first well of the microplate 100, if it is the first focal image stack of the well, but not the first well of the scan, then a range of 200 μm is used, positioned about a prior determined optimal focal position of the closest already imaged well. The prior determined optimal focal position is determined according to the average of the optimal focal positions determined for the well. As discussed above, for each focal image stack subsequent to the first focal image stack, a focal range of 100 μm is determined about the optimal focal position of the closest previous focal image stack.

Capturing the images of a focal image stack requires a set of actions involving the camera 609, illumination member 314, moveable stage member 312 and objective lens movement mechanism 604, 606, 608 described herein, the actions being coordinated by the computing device 302. The microplate 100 is aligned with the next x-y position in the queue of x-y positions and the objective lens 602 is moved to the lowest point of the determined focal range for the focal image stack (and in the present embodiment, minus a window of distance, for example 100 μm, to permit acceleration of the objective lens 602 to full velocity during movement through the focal range). The camera 609 is configured to capture the desired number of frames at its maximum frame rate (160 fps in the embodiment shown) when a rising edge trigger of the encoder strip 608 from the objective movement actuator controller is seen. Said controller is configured to send such an image capture trigger at the lowest position of the determined focal range. The velocity of the objective lens 602 is set so that frames are captured at the desired separation of 4 μm based on the framerate of the camera. Following a predetermined period of time for the objective and microplate plate stage to settle into position, the objective lens movement mechanism moves the objective lens 602 at the given velocity until the upper threshold of the focal range is reached, and after this the objective lens motion is halted.

During said motion, focal image frames are received by the computing device 302 from the camera 609 over USB, and are immediately copied onto the GPU memory and the CPU memory is therefore freed. As each focal image frame of the focal image stack arrives on the GPU, the variance kernel is applied across the entire image as discussed in relation to FIG. 10. Once a new variance image is calculated the data is reduced using a parallel reduce operation, again as described for FIG. 10, until a single summed variance value is obtained for the image. This leaves the original image and a variance score on the GPU. Once every focal image frame for the focal image stack has had its variance score calculated, and is on the GPU memory, the variance scores are copied back to the CPU. An algorithm then finds the peaks in the variance series for the focal image stack and selects a frame that is the most in focus (peak variance). After this, the images are copied back off the GPU, the focal position of said optimal focal position frame is added to a runtime dictionary and the focal image stack is sent, along with corresponding metadata over to a HTTP REST endpoint on a storage server. The images are lossless compressed when sending over to the storage server. The storage server responds with a GUID for each frame which is saved along with the well identification for the scan record.

Once all the wells have been imaged the microplate 100 is moved by the moveable stage member to an eject door of the imaging unit 310 which is opened (actions coordinated by the computing device 302), where the plate may be removed by a user. Movement of the plate out of the door for access by the user is performed using lowered motor torque by lowering current thereto to a level so that the corresponding motor would stall if a hand got in the way.

Figure 11:
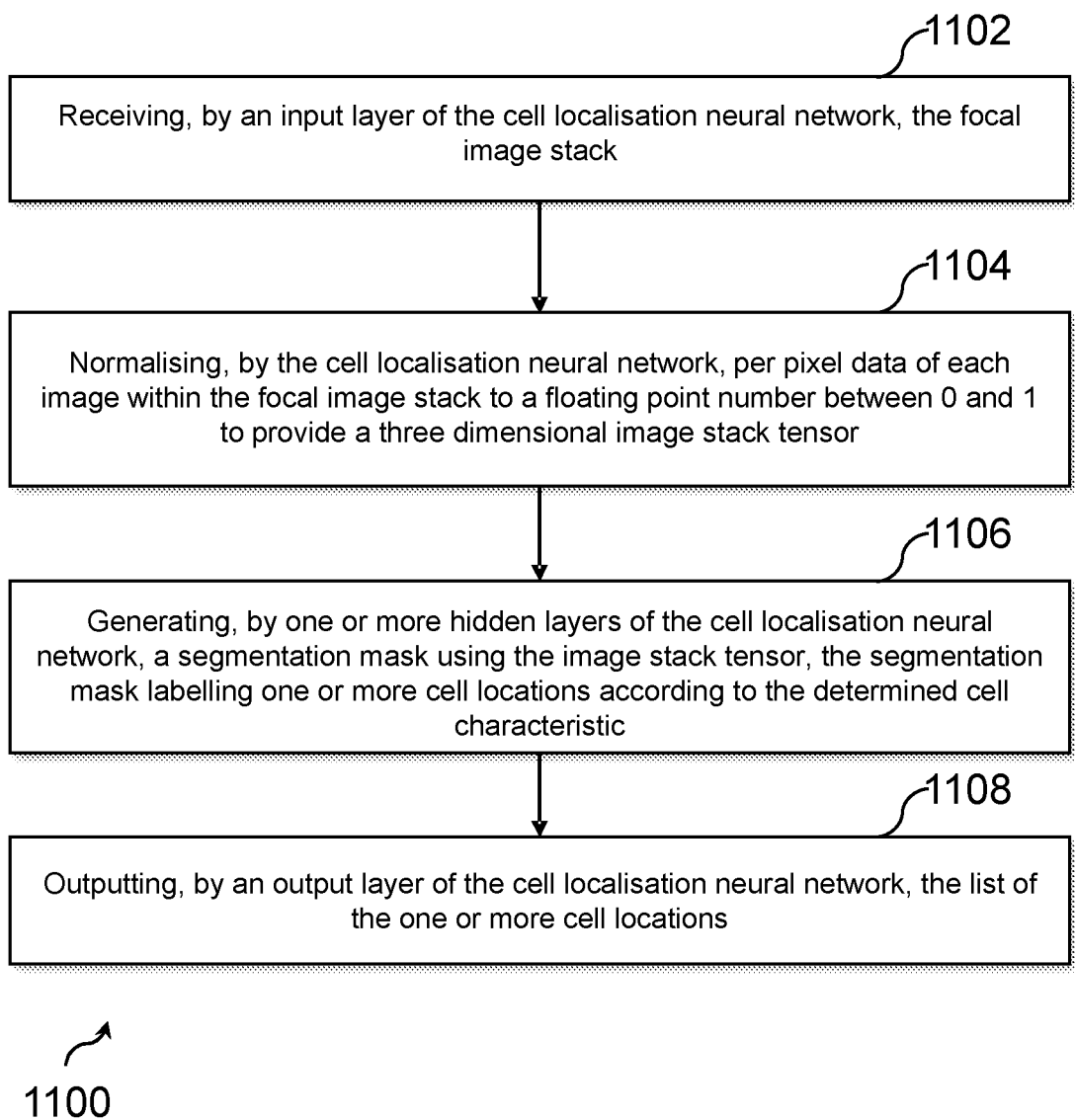
FIG. 11 shows a flowchart outlining additional steps of the example method of FIG. 2, specifically for the determination of the cell locations.

For cell counting each focal image stack is initially processed by a cell localisation neural network, used to determine locations for cells identified in the images of the focal image stack. FIG. 11 outlines steps 1100 for performing said cell localisation, and specifically:

receiving, by an input layer of the cell localisation neural network, the focal image stack 1102;

normalising, by the cell localisation neural network, per pixel data of each image within the focal image stack to a floating point number between 0 and 1 to provide a three dimensional image stack tensor 1104;

generating, by one or more hidden layers of the cell localisation neural network, a segmentation mask using the image stack tensor, the segmentation mask labelling one or more cell locations according to the determined cell characteristic 1106;

outputting, by an output layer of the cell localisation neural network, the list of the one or more cell locations 1108.

Figure 12:
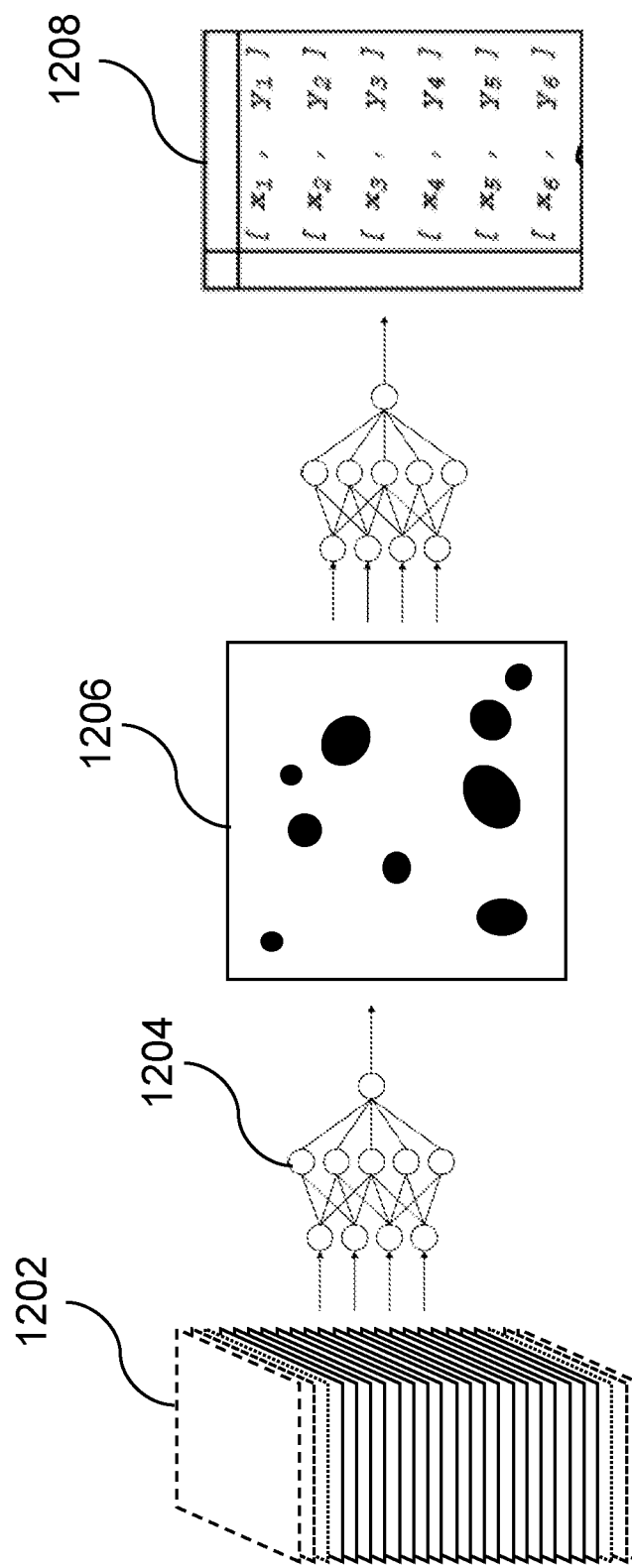
FIG. 12 shows an example scheme for how the cell locations of FIG. 11 are determined.

The key steps of the process are pictorially represented in FIG. 12. In the cell localisation method steps, an n-frame focal image stack 1202 is fed into the cell localisation neural network 1204. In the embodiment described, the images are 1200 pixels by 800 pixels and are in 12 bit depth format. The images are normalised to 16 bit floating point numbers between "0" and "1" 1104. The full stack of these normalised images creates a 1200 (width pixels)×800 (height pixels)×n (number of frames) tensor or array (three dimensional). Initial layers of the cell localisation neural network make use of three-dimensional convolutions of the images, which preferably ensures 3D localised spatial data is extracted almost immediately by the network. The network follows the rough pattern of a segmentation network but makes use of 3D convolutions due to the 3D nature of the tensor/array data. The output of the network is a single 1200×800 normalised image or binary segmentation mask 1206. In the embodiment shown, cell locations are labelled as 1 and "background" and "not cells" are labelled as 0 in the image. In the present embodiment, only the centre (approximately 20% about a determined central point of a cell) of cell area is labelled. This means that cells pressed together still present as separate unconnected dots. Connected components labelling is used to find the separate cells (otherwise referred to as "blob detection") which results in a list of blobs (cell dots identified by the cell localisation neural network). The blobs have their centre identified by bounding box centre. Embodiments will be appreciated wherein any characteristic of the cells is used to identify a cell location, such as centre of gravity. Each said cell location (x and y coordinates within the images) is added to a list of cell locations 1208.

Figure 13:
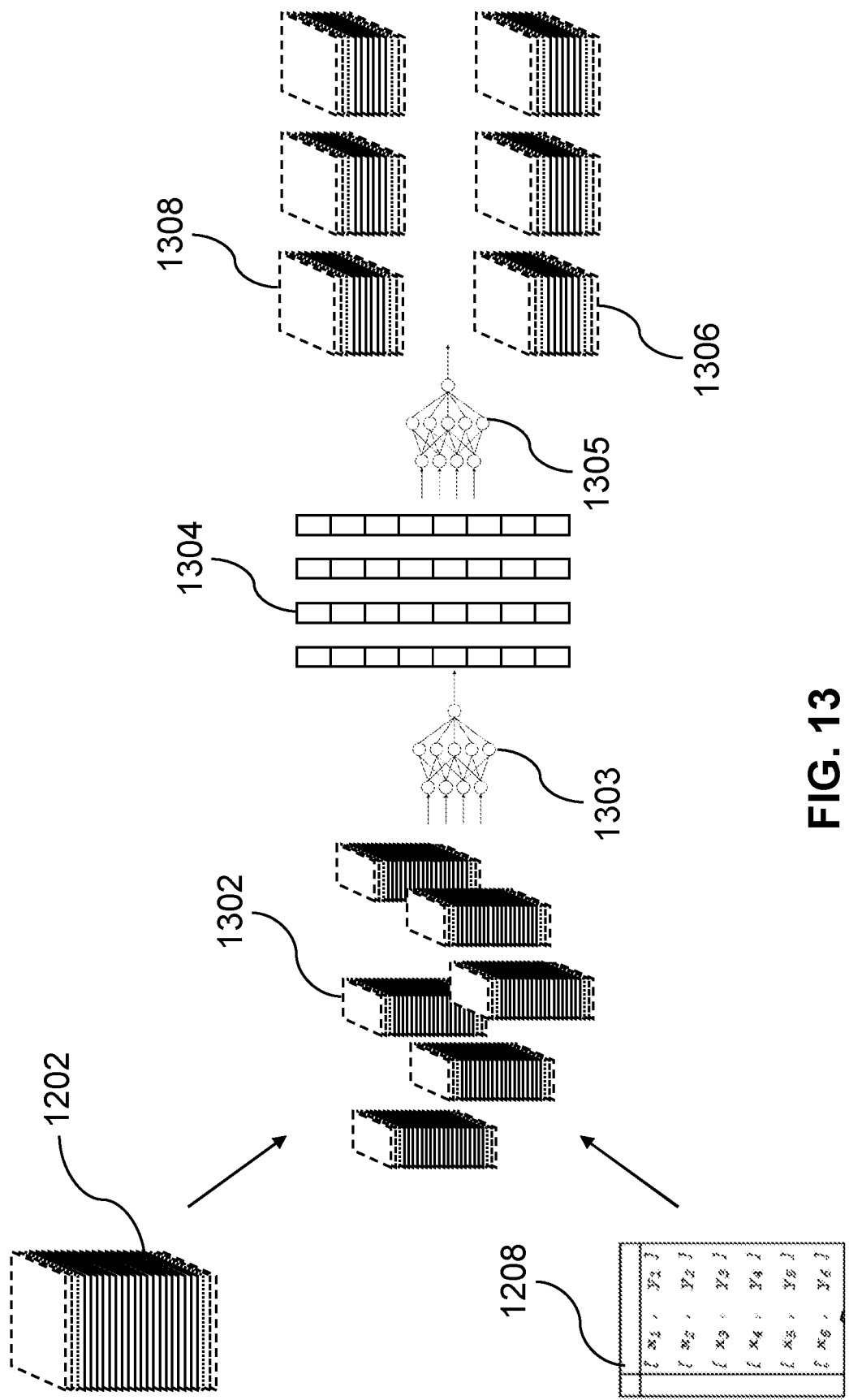
FIG. 13 shows an example scheme for how the cell fingerprint generation and cell counting and classification steps of the method of FIG. 2 are performed.

Subsequent processing to provide a per-cell fingerprint from the focal image stack 1202 and the cell locations 1208 is depicted in FIG. 13. Specifically, with all of the cell locations 1208 identified, each cell location is used to determine a mini focal image stack 1302 for each individual cell identified within the respective focal image stack 1202. For each mini focal image stack 1302 the cell location and a window size of 25×25 pixels of a previously obtained focal image stack is used. The window traverses through the corresponding entire focal image stack and results in a three-dimensional 25×25×n (number of frames) three-dimensional tensor or array. The mini focal image stack tensor/array is normalised to a 16-bit floating point format as previously described and each said array/tensor is provided to an encoder neural network 1303. The encoder neural network makes early use of three-dimensional convolutions to reduce and understand the three dimensional tensor/array. The corresponding data is reduced by a series of hidden layers of the encoder neural network until a one-dimension tensor/array 1304 (which in the present embodiment comprises approximately 700 values) is output by the network 1303. The one-dimensional tensor/array corresponds to a cell fingerprint 1304 for the respective cell. The fingerprints 1304 and corresponding cell location 1208 may then be sent to appropriate endpoints.

In the example 1300 shown, the cell fingerprints 1304 are used for cell identification and classification by a cell classification neural network 1305 to identify live cells 1306 and dead cells 1308 in order to provide a viable cell count as an output of the method 200.

The cells can, for example, be classified by computing the distance between two fingerprints. The distance score may, for example, be calculated as the Euclidian distance measure between the tensors/fingerprints. Cell fingerprints can alternatively, or additionally, be compared with a database of known fingerprints to find the closest match. Additionally, or alternatively, supervised or unsupervised clustering can be performed to assess a cell culture and identify populations. In the present embodiment 1300 for example, the live dead (cell viability) count is performed in a homogenous cell culture, with viability preferably being the largest differentiator. Performing K means clustering on the population's fingerprints will separate the population into live and dead. This can then be used to calculate the viable cell count or viability percentage as an output.

Further embodiments within the scope of the present disclosure may be envisaged that have not been described above. The disclosure is not limited to the specific examples or structures illustrated and will be understood with reference to the claims.

The example described can be further understood with reference to the following paragraphs:

Control of the imaging unit 310 is performed through the directly connected computing device 302. A remote storage and processing server (not shown) is used to manage the data generated and does all the processing of the image data aside from the focal plane scoring (which is performed on the computing device 302 in near real-time by the GPU as to not choke the imaging speed). The storage server is connected via TCP/IP network to the host computers for any number of imaging units 310. The storage server presents several endpoints over HTTP in a RESTful format. Authentication validates a user and device, every record on the device comes from a user, even if this is the "user" default for an imaging unit 310. The server returns an access token with a given lifetime, used to validate other API methods. For a given username and password entry by a user, the password is hashed before it is sent to the server. Backend storage of the username and the password is in either a relational database or backed on an existing authentication system e.g. LDAP. The system is modular for this purpose. "Formal data", corresponding to metadata relating to capture sessions is stored in a relational database of the server. It will be appreciated that storage and processing can be performed either locally or on a remote server.

A RESTfull interface is provided for creating and managing projects, which contains groups of sessions, sessions which represent a scan of a single physical entity (such as a microplate). The session contains many regions, which may be microplate wells, each region containing many objects, which in the present embodiment are cells. Each project contains a name and a list of users connected with the project. Other metadata such as notes may also be connected thereto. Sessions are connected to a single project, each session has a timestamp, and a name (which is preferably the plate name from a corresponding barcode or a user-entered plate name). Notes and runtime metadata are also stored with the session. Sessions contain several regions, these representing wells of the microplate. Sessions have a type, which corresponds to "cell counting" in this particular instance. Regions within a session represents each well, each region has a corresponding name, a timestamp of when it was imaged, and several objects representing cells, and further contain a flexible metadata section. Each region also contains a list of object data identifiers, which link the region to focal image stack images. Also provided is a remote object server, or an object portion/database of the storage and processing server, the object server being used to store large data objects, which in this case are the focal image stacks. Each said object on the object server contains a hashed GUID, raw binary data, and json style metadata dictionary. The storage and processing server has an internal work queue for image processing computation. Upon receiving a focal image stack for a session, the server moves the stack from memory into the object store, once flushed to disk and item is enqueued into a work queue. The item contains the scan type (which in this case is "cell counting" as described) and stack GUID. A processing server "agent" awaits new work in this work queue. Once it receives the work it pulls the image from the object server, performs a corresponding computation and creates a series of object ID's relating to its results, for example locations of cells. Fingerprints for the objects are sent to a corresponding remote fingerprint server, or fingerprint portion/database of the storage and processing server, along with the associated object ID. An additional event is fired into the work queue to mark the completion of a region or session. The fingerprints section of the storage server is a fast hash table lookup for numerical tensors.

In the example shown, the host computing device sends controls to the imaging unit embedded processor and performs focal scoring. The rest of the data is sent to a remote location for storage and processing. All non time critical processing operations are moved to a separate remote server. High performance computing is energy intensive, and so a processing server which generates lots of heat is preferably better placed outside of the controlled environment of a laboratory.

The invention claimed is:

1. A method of counting biological cells using a brightfield microscope, the method comprising the steps of, by a processing device:
   a. positioning a sample to be viewed by way of an objective lens of the microscope, and on an x-y plane at an x-y position of a plurality of x-y positions, the sample comprising a plurality of biological cells;

b. capturing and storing, using an image capturing apparatus, one or more focal image stacks, each said focal image stack comprising a plurality of focal images of the sample positioned at the x-y position, each of the focal images in the focal image stack being captured at a different focal position of a plurality of discrete focal positions within a focal range, the focal range being located on a z plane perpendicular to the x-y plane;

c. processing the one or more focal image stacks using a cell localisation neural network, the cell localisation neural network outputting a list of one or more cell locations, each said cell location corresponding to a cell characteristic determined by the cell localisation neural network;

d. determining, using the list of cell locations, one or more cell focal image stacks, each cell focal image stack being obtained from the one or more focal image stacks;

e. processing the one or more cell focal image stacks using an encoder neural network, the encoder neural network outputting a list of cell fingerprints, each said cell fingerprint corresponding to a cell of the plurality of biological cells; and f. determining, using the list of cell locations and the list of cell fingerprints, a number of cells within the sample.

2. A method as claimed in claim 1, wherein the method further comprises the step of:

g. processing the list of cell fingerprints using a classification neural network, the classification neural network outputting a cell classification of each cell fingerprint of the list of cell fingerprints.

3. A method as claimed in claim 2, wherein the cell classification is determined by the classification neural network by one or more of:

calculating a distance between two said cell fingerprints;
comparing said cell fingerprints with a database of known cell fingerprints;
supervised or unsupervised clustering of said cell fingerprints.

4. A method as claimed in claim 2, wherein the cell classification is one selected from the group: alive cell; dying cell; dead cell; cell type; cell life cycle stage; cell differentiation stage; cell size; cell shape; biomarker type.

5. A method as claimed in claim 1, wherein step b. comprises the steps of:

b-i. positioning the objective lens of the microscope to view the sample at the x-y position, and at a first focal position of a plurality of focal positions, the plurality of focal positions being located on a z plane perpendicular to the x-y plane;

b-ii. capturing, using the image capturing apparatus viewing the sample by way of the objective lens, a first focal image of the sample;

b-iii. storing the first image within a focal image stack located on a memory, the focal image stack corresponding to the x-y position;

b-iv. repositioning the objective lens to view the sample at the x-y position, and at a subsequent focal position of the plurality of focal positions;

b-v. capturing, using an image capturing apparatus, a subsequent focal image of the sample;

b-vi. storing the subsequent focal image within the focal image stack; and b-vii. repeating steps b-iv. to b-vi. for each subsequent focal position of the plurality of focal positions.

6. A method as claimed in claim 5, wherein step b further comprises the step of:

b-viii. repeating steps a. to b-vii. for each subsequent x-y position of the plurality of x-y positions to provide a corresponding focal image stack for each said x-y position.

7. A method as claimed in claim 1, wherein step c. comprises the steps of:

c-i. receiving, by an input layer of the cell localisation neural network, the focal image stack;

c-ii. normalising, by the cell localisation neural network, per pixel data of each image within the focal image stack to a floating point number between 0 and 1 to provide a three dimensional image stack tensor;

c-iii. generating, by one or more hidden layers of the cell localisation neural network, a segmentation mask using the image stack tensor, the segmentation mask labelling one or more cell locations according to the determined cell characteristic;

c-iv. outputting, by an output layer of the cell localisation neural network, the list of the one or more cell locations.

8. A method as claimed in claim 1, wherein the focal range is selected from between 100 µm and 500 µm.

9. A method as claimed in claim 8, wherein the sample is comprised within a first well of a plurality of wells of a microplate, and wherein the focal range for a first focal image stack of a plurality of focal image stacks for said first well is 500 µm.

10. A method as claimed in claim 9, wherein the method further comprises the steps of, immediately prior to capturing each subsequent focal image stack to a first focal image stack of a well:

processing, by a processor, each image of a closest previous focal image stack to determine a focus metric for said image, the focus metric defining an extent to which the sample is in focus in said image;

identifying, by the processor, an optimal focal position along the focal range of said closest previous focal image stack, the optimal focal position being a focal position of a focal image of the closest previous focal image stack along the corresponding focal range having a peak said focus metric; and setting, by the processor, a focal range of said subsequent focal image stack to 100 µm located about the identified optimal focal position.

11. A method as claimed in claim 10, wherein the method further comprises the steps of, immediately prior to capturing a first focal image stack of a subsequent well to the first well:

processing, by the processor, the optimal focal positions of the focal image stacks of the closest previous well to determine a mean optimal focal position for said first focal image stack; and setting, by the processor, a focal range of said first focal image stack to 200 µm located about the mean optimal focal position.

12. A method as claimed in claim 11, wherein the focus metric is a variance score of said image, wherein the variance score is determined by:

convolving a variance filter across a matrix of pixel values of the image to provide a variance image; and applying a reduction function to each image of the variance image to provide a single variance score for the image.

13. A method as claimed in claim 1, wherein a velocity of movement of the objective lens along the focal range is set according to frame rate of capture of the image capturing apparatus, such that a desired frame to frame distance of movement of the objective is achieved between each said captured image of a focal image stack.

14. A method as claimed in claim 13, wherein said frame to frame distance of movement is 4 µm across said range.

15. A method as claimed in claim 1, wherein the objective lens has a magnification of one selected from the group: 4×; 10×; 40×; 50×.

16. A method as claimed in claim 1, wherein the brightfield microscope is arranged to illuminate the sample using collimated light.

17. A method as claimed in claim 1, wherein the brightfield microscope is arranged to illuminate the sample using Köhler illumination.

18. A method as claimed in claim 1, wherein the brightfield microscope is arranged to illuminate the sample using monochromatic light.

19. A system for illuminating, imaging and counting biological cells, the system comprising:
 a brightfield microscope comprising:
 a moveable stage member arranged to support a cell culture device on an x-y plane, the cell culture device comprising a sample of biological cells;
  an illumination member arranged to illuminate the sample;
  a moveable objective lens arranged to magnify the illuminated sample;
  an image capturing apparatus arranged to capture an image of the magnified sample; and a processing device having code portions stored thereon, the code portions arranged when executed by a processor of the processing device to perform a method in accordance with the method of claim 1.

\* \* \* \* \*